US012589898B2

(12) United States Patent
Wyrobek et al.

(10) Patent No.: US 12,589,898 B2
(45) Date of Patent: Mar. 31, 2026

(54) STEERABLE DEPENDENT VEHICLE FOR UNMANNED AERIAL VEHICLES

(71) Applicant: ZIPLINE INTERNATIONAL INC., South San Francisco, CA (US)

(72) Inventors: Keenan A. Wyrobek, South San Francisco, CA (US); Brendan D. Wade, South San Francisco, CA (US); Tristan Semmelhack, South San Francisco, CA (US); Devin Williams, South San Francisco, CA (US); Gregoire Vandenbussche, South San Francisco, CA (US); Rajan Gill, South San Francisco, CA (US); Brian Boomgaard, South San Francisco, CA (US)

(73) Assignee: Zipline International Inc., South San Francisco, CA (US)

( * ) Notice: Subject to any disclaimer, the term of this patent is extended or adjusted under 35 U.S.C. 154(b) by 203 days.

(21) Appl. No.: 18/039,612

(22) PCT Filed: Dec. 1, 2021

(86) PCT No.: PCT/US2021/061389
§ 371 (c)(1),
(2) Date: May 31, 2023

(87) PCT Pub. No.: WO2022/119913
PCT Pub. Date: Jun. 9, 2022

(65) Prior Publication Data
US 2024/0010336 A1      Jan. 11, 2024

Related U.S. Application Data

(60) Provisional application No. 63/153,282, filed on Feb. 24, 2021, provisional application No. 63/153,203, (Continued)

(51) Int. Cl.
*B64U 70/99* (2023.01)
*B64F 1/222* (2024.01)
(Continued)

(52) U.S. Cl.
CPC .............. *B64U 70/99* (2023.01); *B64F 1/222* (2013.01); *B64U 70/97* (2023.01); *B64U 80/10* (2023.01);
(Continued)

(58) Field of Classification Search
CPC ........ B64U 80/25; B64U 80/82; B64U 10/60; B64U 2101/67; B64U 2101/64;
(Continued)

(56) References Cited

U.S. PATENT DOCUMENTS 8,568,076 B1    10/2013   Harris et al.
9,567,081 B1    2/2017    Beckman et al.
(Continued)

FOREIGN PATENT DOCUMENTS

AU        2019213466 A1     9/2020
CA          2829368 A1      4/2015
(Continued)

OTHER PUBLICATIONS

Machine translation of description of CN-108910038-A, Ye, Nov. 30, 2018, pp. 1-4 (Year: 2025).*
(Continued)

*Primary Examiner* — Navid Z. Mehdizadeh
*Assistant Examiner* — Jared C Bean
(74) *Attorney, Agent, or Firm* — Dorsey & Whitney LLP

(57) ABSTRACT

A delivery device to deliver a product from an aerial location includes a body defining a payload holding region. The delivery device may further include a coupling mechanism configured to couple the body to a primary vehicle. The delivery device may further include a control feature con-
(Continued)

figured to change a flight characteristic of the body. A method for delivering a product may include positioning a first unmanned aerial vehicle within a threshold distance of a delivery location. The method may further include releasing a second unmanned vehicle from the first unmanned aerial vehicle once the first unmanned aerial vehicle is within the threshold distance. The method may further include causing the second unmanned vehicle to reach the delivery location. The method may further include activating a delivery mechanism to release the product from the second unmanned vehicle to deliver the product to the delivery location.

31 Claims, 16 Drawing Sheets

Related U.S. Application Data filed on Feb. 24, 2021, provisional application No. 63/120,621, filed on Dec. 2, 2020.

(51) Int. Cl.

| | |
|---|---|
| *B64U 70/97* | (2023.01) |
| *B64U 80/10* | (2023.01) |
| *B64U 80/25* | (2023.01) |
| *B64U 101/64* | (2023.01) |
| *G05D 1/00* | (2024.01) |
| *G05D 1/654* | (2024.01) |

(52) U.S. Cl.
CPC .............. *B64U 80/25* (2023.01); *G05D 1/104* (2013.01); *G05D 1/654* (2024.01); *B60L 2200/10* (2013.01); *B64U 2101/64* (2023.01)

(58) Field of Classification Search
CPC .... B64U 10/00; B64U 80/00; B64U 2101/00; B64U 2101/60; B64U 2101/66; G05D 1/104; G05D 1/102; G05D 1/00; G05D 2103/00; B64D 1/22; B64D 1/08; B60L 53/14; B60L 2200/10; B64F 1/222; Y02T 10/7072; Y02T 10/70; B64C 1/00; B64C 1/0009; B64C 1/06; B64C 1/061; B64C 1/062; B64C 1/063; B64C 1/064; B64C 1/065; B64C 1/068; B64C 1/069; B64C 27/08; B64C 27/10; B64C 27/20; B64C 39/00; B64C 39/001; B64C 39/003; B64C 39/005; B64C 39/006; B64C 39/008; B64C 39/02; B64C 39/024; B64C 39/029
See application file for complete search history.

(56) References Cited

U.S. PATENT DOCUMENTS

| | | | | |
|---|---|---|---|---|
| 9,656,805 | B1 | 5/2017 | Evans et al. | |
| 10,453,348 | B2 * | 10/2019 | Speasl | G06Q 10/08 |
| 10,493,863 | B1 | 12/2019 | Thrun et al. | |
| 10,514,690 | B1 * | 12/2019 | Siegel | G05D 1/0027 |
| 10,647,427 | B2 | 5/2020 | Buchmueller | |
| 2015/0377405 | A1 | 12/2015 | Down et al. | |
| 2016/0195443 | A1 * | 7/2016 | Jensen | G01M 9/06 |
| | | | | 73/862.041 |
| 2017/0038780 | A1 | 2/2017 | Fandetti | |
| 2017/0247109 | A1 * | 8/2017 | Buchmueller | B64D 1/08 |
| 2017/0369169 | A1 * | 12/2017 | Lee | B64U 10/16 |
| 2018/0155018 | A1 * | 6/2018 | Kovac | B64U 30/26 |
| 2018/0155021 | A1 * | 6/2018 | Patterson | B64C 3/00 |
| 2019/0043370 | A1 * | 2/2019 | Mulhall | G08G 5/26 |
| 2019/0100307 | A1 * | 4/2019 | Beltman | B64C 37/02 |
| 2019/0193855 | A1 * | 6/2019 | Prager | G06F 21/31 |
| 2019/0202563 | A1 | 7/2019 | Wiggerich | |
| 2019/0220044 | A1 * | 7/2019 | Ruth | B64U 80/86 |
| 2019/0265717 | A1 * | 8/2019 | McHale | G06Q 10/0832 |
| 2020/0055596 | A1 * | 2/2020 | Millhouse | B64C 9/323 |
| 2020/0062385 | A1 | 2/2020 | Randall | |
| 2020/0115049 | A1 | 4/2020 | Nakamura et al. | |
| 2020/0167722 | A1 * | 5/2020 | Goldberg | G08G 5/22 |
| 2020/0324902 | A1 * | 10/2020 | Burgess | B64D 1/22 |
| 2020/0369382 | A1 * | 11/2020 | Thrun | B64C 37/02 |
| 2021/0031912 | A1 | 2/2021 | Yates | |
| 2021/0300557 | A1 * | 9/2021 | Oshima | G05D 1/104 |
| 2024/0140629 | A1 | 5/2024 | Boomgaard et al. | |

FOREIGN PATENT DOCUMENTS

| | | | | | |
|---|---|---|---|---|---|
| CA | 2976785 | A1 | 8/2016 | | |
| CA | 3037707 | A1 | 12/2019 | | |
| CA | 3044218 | A1 | 1/2020 | | |
| CN | 108910038 | A * | 11/2018 | .......... | G05D 1/0202 |
| WO | 2020032262 | A1 | 2/2020 | | |
| WO | 2020210904 | A1 | 10/2020 | | |
| WO | 2020234427 | A1 | 11/2020 | | |

OTHER PUBLICATIONS

Machine translation of the description of CN-108910038-A (Year: 2025).*
International Search Report and Written Opinion dated Feb. 18, 2022 in connection with International Patent Application No. PCT/US2021/061389, 18 pages.
International Search Report and Written Opinion dated May 18, 2022 in connection with International Patent Application No. PCT/US2022/017585.
Extended European Search Report dated Feb. 11, 2025 in connection with European patent application No. 22760361.0, 11 pages.
Extended European Search Report dated Nov. 27, 2024 in connection with European patent application No. 21901375.2, 16 pages.

* cited by examiner

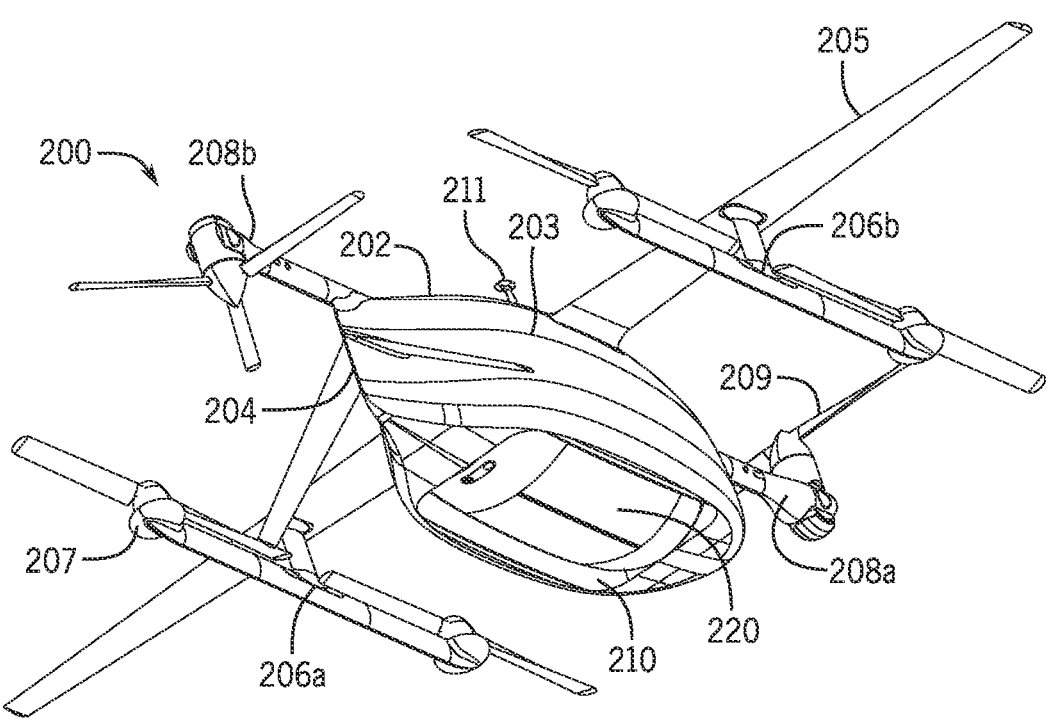
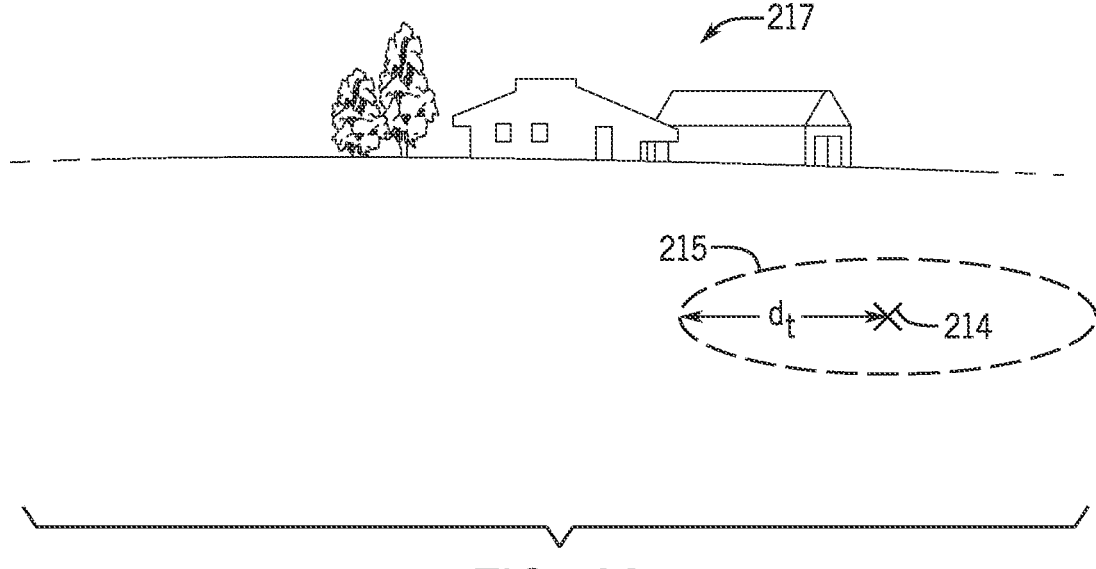
FIG. 4A

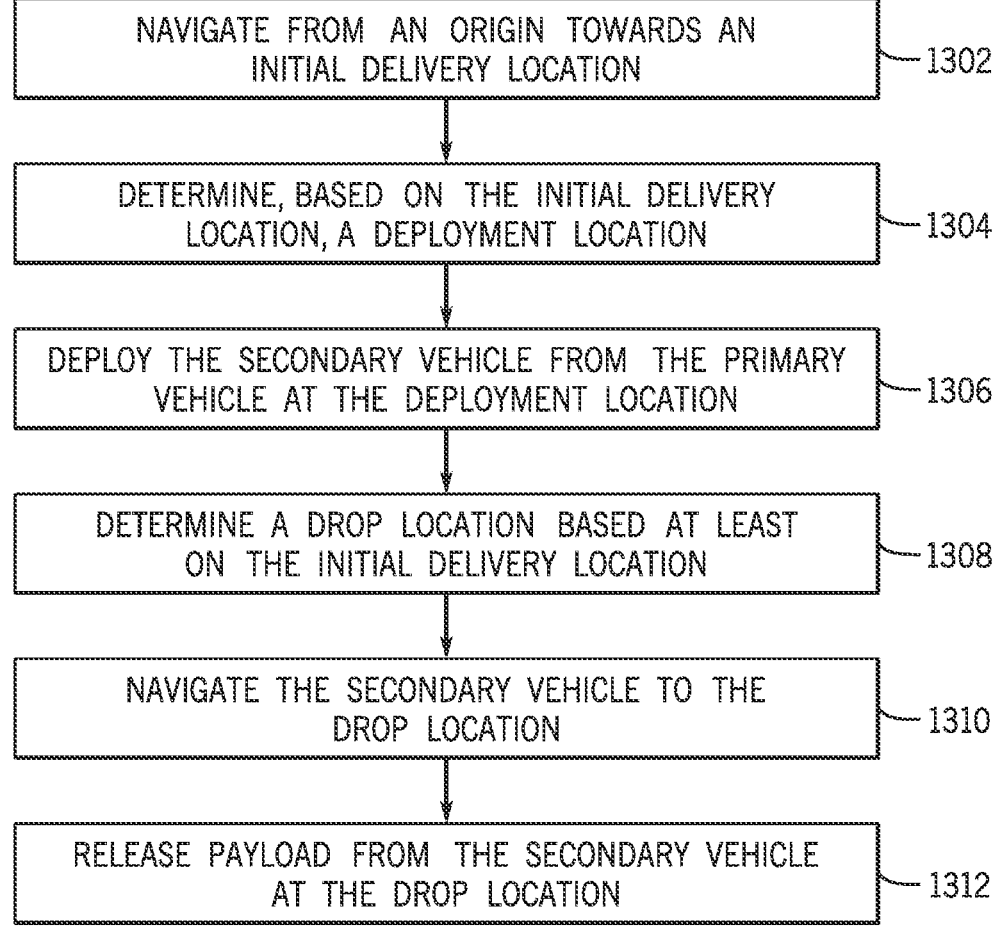

NAVIGATE FROM AN ORIGIN TOWARDS AN
INITIAL DELIVERY LOCATION ⎯1302

DETERMINE, BASED ON THE INITIAL DELIVERY
LOCATION, A DEPLOYMENT LOCATION ⎯1304

DEPLOY THE SECONDARY VEHICLE FROM THE PRIMARY
VEHICLE AT THE DEPLOYMENT LOCATION ⎯1306

DETERMINE A DROP LOCATION BASED AT LEAST
ON THE INITIAL DELIVERY LOCATION ⎯1308

NAVIGATE THE SECONDARY VEHICLE TO THE
DROP LOCATION ⎯1310

RELEASE PAYLOAD FROM THE SECONDARY VEHICLE
AT THE DROP LOCATION ⎯1312

FIG. 13

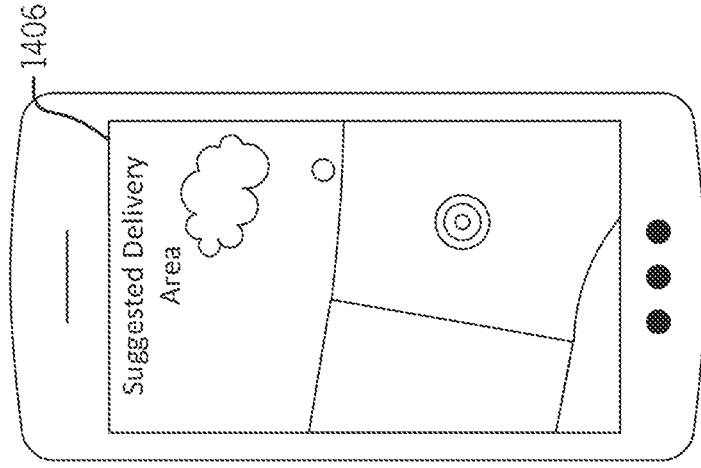
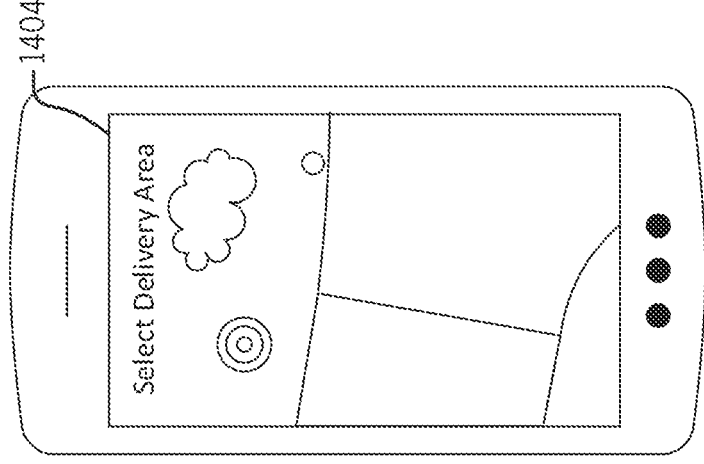
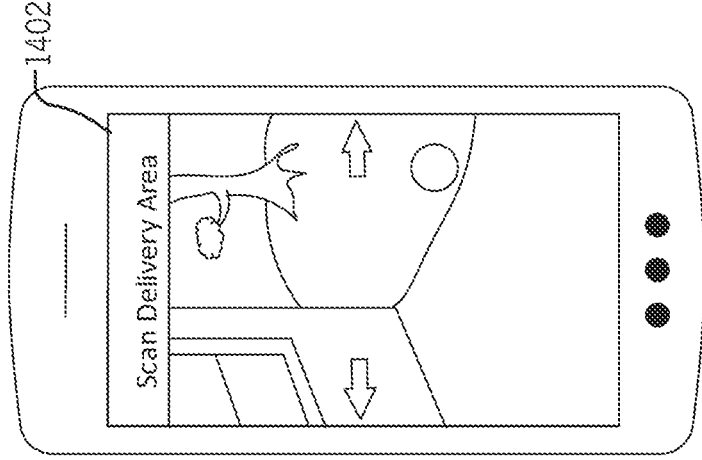
FIG. 14

STEERABLE DEPENDENT VEHICLE FOR UNMANNED AERIAL VEHICLES

CROSS-REFERENCE TO RELATED APPLICATIONS

This application is a U.S. National Stage Application of International Patent Application No. PCT/US2021/061389, filed Dec. 1, 2021, which claims priority to U.S. Provisional Patent Application No. 63/120,621, filed Dec. 2, 2020, entitled "UNMANNED AERIAL VEHICLE DELIVERY SYSTEM," U.S. Provisional Patent Application No. 63/153,203, filed Feb. 24, 2021, entitled "AUTONOMOUS VEHICLE DELIVERY SYSTEM," and U.S. Provisional Patent Application No. 63/153,282, filed Feb. 24, 2021, entitled "AUTONOMOUS VEHICLE DELIVERY SYSTEM," each of which is incorporated by reference herein, in the entirety and for all purposes.

FIELD

The described examples relate generally to unmanned aerial vehicles and systems and methods of control thereof.

BACKGROUND

Unmanned aerial vehicles (UAVs) are increasingly used as package delivery vehicles. UAVs take many forms, such as rotorcraft (e.g., helicopters, quadrotors, and so on) as well as fixed-wing aircraft. UAVs may also be configured for different degrees of autonomy and may have varying complexity. Packages may be loaded into a UAV for delivery at a drop location or other delivery site. Once the package(s) are delivered, the UAV may return to one or more loading locations to receive additional package(s). Conventional systems may be particularly unsuited for delivering a payload or package to existing residential, commercial, and/or industrial locations, which may lack systems or structures for receiving or landing the UAV. For example, it may be impractical to deliver a payload to a precise delivery target, such as a precise delivery target in a dense urban setting, without landing the UAV and/or without specialized facilities, thereby limiting the adoption of UAV-based delivery with conventional systems. Further, landing a conventional UAV may require smaller UAVs, which may reduce the delivery radius. In some cases, landing a conventional UAV may present hazards to persons and property at the ground, in light of the numerous moving parts of the UAV. Further, landing a conventional UAV requires the UAV to come to a complete stop, which may substantially increase delivery time. As such, there is a need for systems and techniques to improve payload delivery using a UAV.

SUMMARY

Examples of the present invention are directed to steerable dependent vehicles for unmanned aerial vehicles and methods of operation.

In one example, a method for delivering a product is disclosed. The method includes positioning a first unmanned aerial vehicle within a threshold distance of a delivery location. The method further includes releasing a second unmanned vehicle from the first unmanned aerial vehicle once the first unmanned aerial vehicle is within the threshold distance. The method further includes causing the second unmanned vehicle to reach the delivery location. The method further includes activating a delivery mechanism to release the product from the second unmanned vehicle to deliver the product to the delivery location.

In another example, the causing of the second unmanned vehicle to reach the delivery location may further include actively steering the second unmanned vehicle. Actively steering the second unmanned vehicle may include changing at least one of a position, a speed, or a heading of the second unmanned vehicle by varying at least one of a position, a speed, or a heading of the first unmanned vehicle. Actively steering the second unmanned vehicle may further include activating a steering mechanism on the second unmanned vehicle to directly change the position, the speed, or the heading of the second unmanned vehicle. The steering mechanism may include at least one thruster coupled to the second unmanned vehicle.

In another example, causing the second unmanned vehicle to reach the delivery location may further include selectively timing the releasing of the second unmanned vehicle from the first unmanned aerial vehicle once based on at least one of: a wind characteristic of the delivery location or a position of the first unmanned aerial vehicle relative to the delivery location.

In another example, the second unmanned vehicle may be coupled to the first unmanned aerial vehicle. For example, the second unmanned vehicle may be releasably coupled to the first unmanned vehicle via a mechanical connection.

In another example, the method may further include retracting the second unmanned vehicle to the first unmanned aerial vehicle after the product has been delivered. Further, positioning the second unmanned vehicle within the first unmanned aerial vehicle may include operating a retraction mechanism to physically induce the second unmanned vehicle into a compartment within the first unmanned aerial vehicle.

In another example, the second unmanned vehicle may be steerable by and relative to the first unmanned aerial vehicle. In some cases, the method may further include releasing the second unmanned vehicle along a ground surface at or adjacent to the delivery location, and causing the second unmanned vehicle to travel a distance on the ground surface.

In another example, a delivery device to deliver a product from an aerial location is disclosed. The delivery device may include a body defining a payload holding region. The delivery device may further include a coupling mechanism configured to couple the body to a primary vehicle. The delivery device may include a control feature configured to change a flight characteristic of the body.

In another example, the body may further include a delivery cover that covers the payload holding region. In a closed position of the delivery cover, the payload holding region may be inaccessible from an exterior surface of the body. Further, in an open position of the delivery cover, the payload holding region may be accessible from the exterior surface of the body. Further, the body may include a loading cover that covers the payload holding region. In this regard, in a closed position of the loading cover, the payload holding region may be inaccessible from the exterior surface of the body, and in an open position of the loading cover, the payload holding region is accessible from the exterior surface of the body. In some cases, the loading cover may extend over a loading opening in the exterior surface of the body and the delivery cover extends over a delivery opening in the exterior surface of the body opposite the loading opening, wherein the delivery opening is larger than the loading opening.

In another example, the delivery device may further include a bumper extending around at least a portion of the body. The bumper may reduce impact forces experienced by the at least the portion of the body. The delivery device may further include a controller in electrical communication with the steering mechanism and the primary vehicle. The controller may activate and control the steering mechanism.

In another example, the coupling mechanism may be configured to manipulate the body in response to forces exerted on the coupling mechanism by the primary vehicle. The coupling mechanism may act to direct the body based on movement of the primary vehicle.

In another example, a system is disclosed. The system includes a primary unmanned aerial vehicle. The system may further include a dependent unmanned aerial vehicle coupled to the primary unmanned aerial vehicle. The primary unmanned aerial vehicle may be configured to adjust macro positions of the dependent unmanned aerial vehicle. The dependent unmanned aerial vehicle may be configured to adjust micro positions of the dependent unmanned aerial vehicle separate from the macro positions.

In another example, the primary unmanned aerial vehicle may manipulate the macro positions of the dependent unmanned aerial vehicle by generating a change in a flight characteristic that translates to a force applied to a mechanical coupling on the dependent unmanned aerial vehicle.

In another example, the dependent unmanned aerial vehicle may include a steering mechanism to change a velocity or a heading of the dependent unmanned aerial vehicle. Further, the system may include a tether that mechanically couples the primary unmanned aerial vehicle to the dependent unmanned aerial vehicle. The dependent unmanned aerial vehicle may be electronically and/or communicatively coupled with the primary unmanned aerial vehicle via the tether. The tether may further include a bridle that defines a multi-point attachment with the dependent UAV.

In addition to the exemplary aspects and examples described above, further aspects and examples will become apparent by reference to the drawings and by study of the following description.

BRIEF DESCRIPTION OF THE DRAWINGS

FIG. 4A depicts another example system, including a primary unmanned aerial vehicle (UAV) and a dependent unmanned aerial vehicle (UAV) in a first configuration, in which the dependent UAV is received by the primary UAV.

FIG. 13 is a flow diagram of steps for delivery of a payload by an example AV system including a primary vehicle and a secondary vehicle.

FIG. 14 illustrates examples of a user interface for selecting a drop location for delivery of a payload by a AV including a primary vehicle and a secondary vehicle.

DETAILED DESCRIPTION

Figure 1:
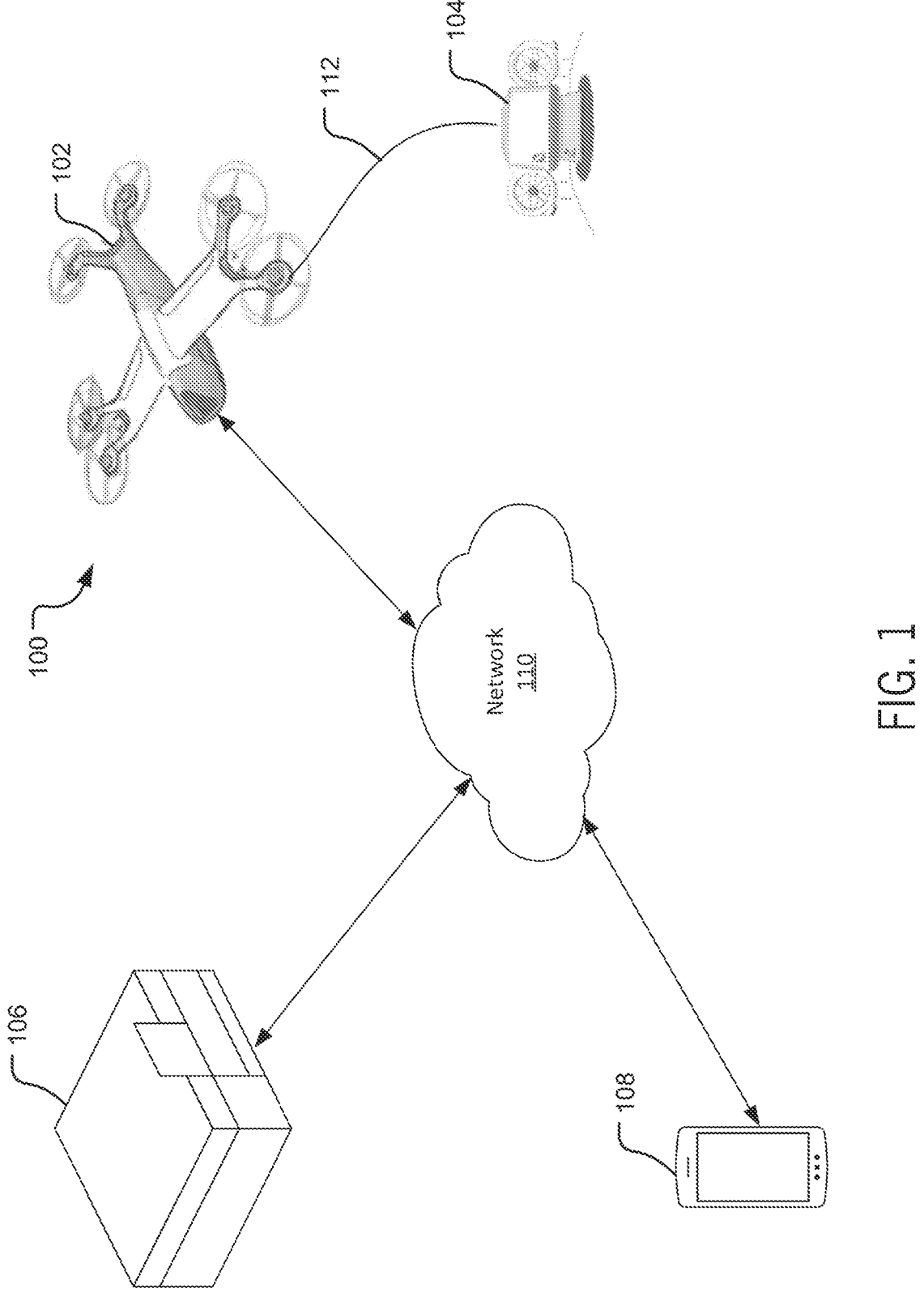
FIG. 1 illustrates an example autonomous vehicle system including a primary vehicle and a secondary vehicle in communication with a customer device on a route from an origin to an initial delivery location.

The description that follows includes sample systems, methods, and apparatuses that embody various elements of the present disclosure. However, it should be understood that the described disclosure may be practiced in a variety of forms in addition to those described herein.

The following disclosure relates generally to dependent vehicles (also referred to herein as second or secondary unmanned vehicles) for unmanned aerial vehicles (UAVs) and associated systems and methods of use. The dependent vehicle may be substantially any type of vehicle that is operated in an autonomous or semi-autonomous manner. The operation of the dependent vehicle may be dependent on a UAV, such as a primary UAV. For example, the dependent vehicle may be a dependent UAV that may remain airborne, dependent or based on the primary UAV remaining airborne. Similarly, the dependent UAV may execute a flight path and/or more generally move, dependent or based on the flight path and movements of the primary UAV. Further, the dependent UAV may move relative to the primary UAV using various steering mechanisms (e.g., thrusters, inertia wheels, and so on) and coupling mechanism (e.g., tethers, winches, and so on) associated with one or both of the dependent UAV and/or the primary UAV. Additionally or alternatively, the dependent vehicle may be configured to travel along a ground surface. The operation of the dependent vehicle along the ground may be dependent, in part, on the operation of the primary UAV, such as being dependent on the primary UAV causing the dependent UAV to reach the ground or delivery location.

The dependent UAV and the primary UAV may collectively define a UAV system. Broadly, the primary UAV may be configured to travel between a payload receiving location (e.g., retail, commercial, industrial, or other sites) and a payload drop location (e.g., a residential or commercial address, among others). The primary UAV may carry or help support the dependent UAV to the payload drop location, and release the dependent UAV at or near the payload drop location. The dependent UAV may be coupled to and/or hold a payload or package and be configured to travel between the primary UAV and the designated drop target. At or near the designated drop target, the dependent UAV may release or otherwise allow access to the payload or package for subsequent retrieval or access by the customer.

In operation, the primary UAV and the dependent UAV may cooperate to deliver the payload to the delivery target or location. For example, upon release from the primary UAV, the dependent UAV may be caused to reach the delivery location. For example, the dependent UAV may be steered or navigated toward the delivery location. In one implementation, the primary UAV may be configured to adjust macro positions of the dependent UAV, for example, by generating a change in a flight characteristic that translates to a force applied to the dependent UAV. Additionally or alternatively, the dependent UAV may be configured to adjust micro positions of the dependent UAV, for example, by changing a velocity or a heading of the dependent unmanned aerial vehicle. Controlling the movement of the dependent UAV in this manner may allow for more fine-tuned or precise control of the dependent UAV toward the delivery location. Additionally or alternatively, the dependent UAV may be caused to reach the delivery location by timing a release of the dependent UAV from the primary UAV based on a wind speed and/or position of the primary UAV, as described herein. In turn, the dependent UAV may be capable of reaching delivery locations with a high-degree of obstacles that would otherwise impede payload delivery, such as trees, power lines, porches, pedestrians, awnings. For example, the primary UAV and the dependent UAV may broadly cooperate to steer the dependent UAV around such obstacles, which thereby increases the potential delivery locations that the dependent UAV may reach.

The UAV system may include primary UAVs and dependent UAVs of various types, constructions, propulsion methods, and so on. Without limitation, the primary UAV may include rotorcraft (e.g., helicopters, quadrotors, and so on) as well as fixed-wing aircraft. The dependent UAV may include a collection of components and subassemblies that allow for the physical attachment of the dependent UAV to the primary UAV, and that also allow for the loading, storage, and release of payloads therein. In one implementation, the dependent UAV includes a body defining a payload capacity configured to receive a payload. The payload may be advanced into the body via a cover, door, trap or the like. Analogously, the payload may be released for delivery from the payload capacity via another mechanism, such as another cover, door, and/or trap. The dependent UAV may include a coupling mechanism or tether that physically, and optionally electrically or communicatively, couples the dependent UAV to the primary UAV. The coupling mechanism may also facilitate steering the dependent UAV, for example, as the macro adjustments of the primary UAV pull or push the dependent UAV using the coupling mechanism or tether. Additionally or alternatively, the dependent UAV may include thrusters, inertia wheels, and so to move the dependent UAV and cause the micro adjustments. In other implementations, the dependent UAV may include other systems and subassemblies, including arrangements in which the dependent UAV does not include thrusters or other features to adjust micro positions. The dependent UAV may be used to allow the primary UAV to have a longer range than conventional drove deliveries. For example, in part because the primary UAV is not required to land at the delivery site, the primary UAV may be larger, more robust and/or have a longer range than would otherwise be possible if the primary UAV itself landed at the delivery site.

Turning to the Drawings, FIG. 1 illustrates an example UAV system 100 including a primary vehicle 102 and a secondary vehicle 104 in communication with a customer device 108 and an origin 106 through a network 110.

The primary vehicle 102 may be implemented by various autonomous aircraft with payload capacity for retaining the secondary vehicle 104 for delivering commercial items to consumers. For example, in one embodiment, the primary vehicle 102 is a fixed-wing aircraft with redundant propulsion systems optimized for long range flight. In another embodiment, the primary vehicle 102 is implemented using a quad rotor aircraft. In other embodiments, the primary vehicle 102 may be implemented by a hybrid fixed-wing aircraft, a fixed-wing aircraft including horizontal and vertical motors, a glider, helicopter, or other aircraft. The primary vehicle 102 may include various hardware and software components to execute flight plans and communicate with the secondary vehicle 104 to deliver payload to a drop location.

The secondary vehicle 104 may be implemented by various autonomous aircraft with payload capacity for delivering commercial items to consumers. For example, in one embodiment, the secondary vehicle 104 is implemented by an aircraft using horizontal and vertical motors for precise maneuvering of the secondary vehicle 104. In other embodiments, the secondary vehicle 104 may be implemented by a fixed-wing aircraft, hybrid fixed-wing aircraft, quad rotor aircraft, glider, helicopter, or other aircraft. The secondary vehicle 104 may include various hardware and software components to navigate from the primary vehicle 102 to a delivery or drop location, to communicate with the primary vehicle 102, and perform other functions to deliver payload to a drop location.

The UAV system 100 may communicate with the origin 106, the customer device 108, and other devices via the network 110. In various embodiments, the network 110 may be implemented by various radiofrequency bands such as very high frequency (VHF) bands, satellite communications, and cellular communications. Various portions of the network 110 may be implemented using the Internet, a local area network (LAN), a wide area network (WAN), and/or other networks. In addition to traditional data networking protocols, in some embodiments, data may be communicated according to protocols and/or standards including near field communication (NFC), Bluetooth, cellular connections, and the like. Further, the UAV system 100 may communicate with different device using different networks. For example, the UAV system 100 may communicate with the origin 106 using a VHF band and with the customer device 108 using a cellular data network.

The UAV system 100 may travel from an origin 106. The origin 106 may be, for example, a warehouse, distribution center, retail location, or other fixed or mobile facility that facilitates the launch of the UAV system 100 and where the UAV system 100 may receive payload (e.g., items for an order). In some implementations, multiple distribution centers may form a distribution network, where the UAV system 100 may launch from, land at, and/or fly between any of the distribution centers in the network. For example, a distribution network may include a regional distribution center for a retailer and retailer locations of the retailer served by the distribution center. The origin 106 and any distribution center may include specialized infrastructure, such as launch and landing platforms, for the UAV system 100.

The customer device 108 may communicate with the origin 106 to place an order to be fulfilled by the UAV system 100. In some implementations, the customer device 108 may also communicate with the UAV system 100 as it delivers the order. For example, the customer device 108 may communicate a drop location to the UAV system 100 or may communicate with the secondary vehicle 104 after the secondary vehicle 104 is deployed from the primary vehicle 102. The customer device 108 may be, for example, a personal computing device. In some embodiments, the customer device 108 is a smart phone or tablet that allows a consumer to track and/or update an order being delivered by the UAV system 100.

Figure 2:
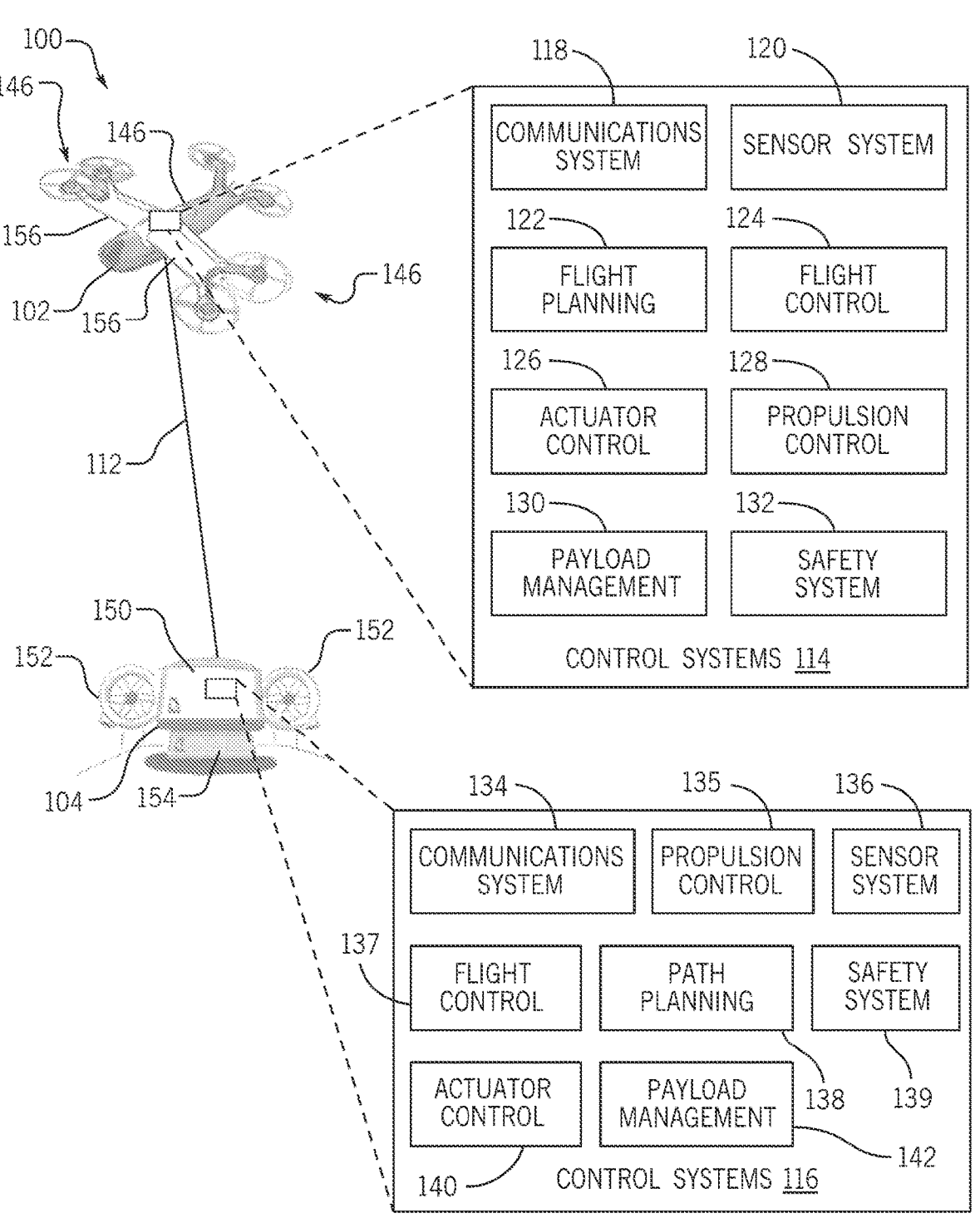
FIG. 2 is a schematic diagram of an example primary vehicle and a secondary vehicle.

FIG. 2 is a schematic diagram of the UAV system 100 in accordance with particular embodiments. The UAV system 100 includes the primary vehicle 102 and the secondary vehicle 104, which may be connected to the primary vehicle 102 by a tether 112. The tether 112 may operate to mechanically, electrically, and/or communicatively couple the primary vehicle 102 and the second vehicle 104. The primary vehicle 102 includes control systems 114 and the secondary vehicle 104 includes control systems 116. The components shown as part of the control systems 114 and the control systems 116 are exemplary and may vary in some implementations. For example, in some implementations, path planning and payload management for the secondary vehicle 104 may be implemented at the control systems 114 of the primary vehicle 102.

The primary vehicle 102 generally includes a body 146 and propulsion 148, and wings 156. The body 146 may be configured to hold or retain the secondary vehicle 104. Wings 156 may be connected to the body 146 and may include, in some implementations, a first wing segment and a second wing segment. The propulsion system 148 may be configured to induce forward travel of the primary vehicle 102 and may include, in some implementations, a plurality of rotor assemblies. For example, a first rotor assembly may be associated with the wings 156 and a second rotor assembly may be associated with a tail section of the primary vehicle 102. In some implementations, rotor assemblies of the primary vehicle 102 may be configured to also perform a hovering operation of the primary vehicle 102. For example, the rotor assemblies may be configured to transition between a first configuration optimized for forward motion and a second configuration optimized for hovering of the primary vehicle 102. The body 146 of the primary vehicle 102 may also house some or all of the control systems 114 of the primary vehicle.

The control systems 114 may be implemented by various hardware modules. In some implementations, various components of the control systems 114 may be combined into a single component and the control systems 114 may be implemented by any number of hardware components including system on chip (SOC) hardware, various processors, controllers, and programmable logic. Various hardware modules may be interconnected by a communications bus, which may be implemented using a Controller Area Network (CAN) standard. In some implementations, some modules of the control systems 114 may be implemented using computing resources not located within the primary vehicle 102. For example, flight planning 122 may be implemented by a ground-based computing device in communication with the primary vehicle 102. Further, in various implementations, the control systems 114 of the primary vehicle 102 may include additional or different components performing additional or different functions for control of the UAV system 100 and the primary vehicle 102.

A communications system 118 of the control systems 114 of the primary vehicle 102 may comprise transmitters and receivers that enable the primary vehicle 102 and the UAV system 100 to send and receive information using various communications protocols. Further, the communications system 118 may comprise transmitters and receivers that enable the primary vehicle 102 to communicate with the secondary vehicle 104 when the secondary vehicle 104 is not retained in the primary vehicle 102. For example, the communications system 118 may include transmitters and receivers for various sensing modalities, including code division multiple access (CDMA), global system for mobile communications (GSM), various cellular standards (e.g., 3G/4G/5G), long-term evolution (LTE), WiFi, Bluetooth, and custom line of sight and mesh protocols that may allow the UAV system 100 to communicate with other UAV systems.

The sensor system 120 may include various sensors configured to gather different types of information about the environment of the UAV system 100 and/or the primary vehicle 102. For example, the sensor system 120 may include a global positioning system (GPS), inertial measurement unit (IMU), dynamic pressure sensors, static pressure sensors, air temperature sensors, proximity sensors, and other sensors. The sensor system 120 may also include visual or range finding sensors, such as stereo cameras, Lidar (light detection and ranging), time-of-flight Lidar, and the like.

Control systems 114 may further include, for example, actuation control 126, propulsion control 128, payload management 130, and a safety system 132. The actuator control system 126 may include actuators that control various moving parts of the primary vehicle 102, such as rudders, elevators, and other control structures of the primary vehicle 102. The actuator control system 126 may change the state of the actuators of the primary vehicle 102 and may report the current state of any actuators to other components of the control systems 114.

Propulsion control 128 may control force exerted by any engines included in the primary vehicle 102 (e.g., by adjusting the speed of propellers mounted on a propeller powered vehicle). Propulsion control 128 may also monitor an amount of fuel or battery power remaining on the primary vehicle 102. Payload management 130 may perform functions related to the payload and may, for example, control release of the secondary vehicle 104. In some examples, payload management 130 may also provide control of a winch or other mechanism controlling a tether 112 connecting the secondary aircraft 104 to the primary aircraft 102. Safety system 132 may perform functions related to managing functions of the UAV system 100 in the event of a system failure, such as a power loss, collision, mechanical failure, and so on. The safety system 132 may monitor operations of the UAV system 100 and determine when a failure event has occurred. The safety system 132 may be configured to deploy one or more mitigation measures based on a detected type of safety event and severity. As an illustration, in the event of a power drop (e.g., a failure of a battery cell or component), the safety system 132 may be configured to redirect power to components of the UAV system 100 that operate to maintain flight, and cause the UAV system 100 to return to a facility for repair. As another illustration, in the event of a total power loss, the safety system 132 may be configured to deploy a parachute and/or other device configured to assist the UAV 100 in reaching a ground surface with less severity.

A flight controller 124 may store the flight plan and provide instructions to control systems of the primary vehicle 104 to execute the flight plan. The flight controller 124 may receive data from the communications system 118 and the sensor system 120 to continuously compute the location, speed, and heading of the primary vehicle 102. The flight controller 124 may combine location information with the flight plan and determine what, if any, changes or adjustments may be made to keep the primary vehicle 102 on a path specified in the flight plan. For example, the flight controller 124 may compute waypoints for the primary vehicle 102 and/or the UAV system 100 to fly from an origin to a deployment location and compute orientation and propulsion to move the UAV system 100 to a next waypoint. The flight controller 124 may then send commands to other modules of the control systems 114, such as the actuator control 126 and the propulsion control 128 to take action to adjust the orientation and speed of the UAV system 100.

The flight controller 124 may continuously calculate an estimated position, orientation, and speed of the primary vehicle 102 using state estimation based on information received from other components of the control systems 114. For example, the flight controller 124 may perform state estimation using engine state information from the propulsion control 128, actuator state information from actuator control 126, and information from various sensors of the sensor system 120. The flight controller 124 may then determine appropriate adjustments for propulsion and actuation for the primary vehicle 102 to continue moving along a flight defined in the flight plan.

A flight planner 122 may use order and flight data to generate and update flight plans to fulfill orders using the UAV system 100. The flight planner 122 may be implemented by computing systems apart from the control systems 114 or may be implemented at the primary vehicle 102 as part of the control systems 114. For example, in some implementations, the flight planner 122 is implemented by cloud computing resources in communication with the control systems 114 via the network 110. In some implementations, the flight planner 122 may be implemented by computing systems located at a distribution location (e.g., the origin 106) within the distribution network or at a centralized control location. The flight planner 122 may be in continuous communication with the primary vehicle 104. Similarly, order and flight data may be located at the primary vehicle 102, at a storage location apart from the primary vehicle 102 (e.g., cloud storage or a flight control database) or at a combination of locations.

The secondary vehicle 104 of the UAV system 100 generally includes a body 150 and control features 152. The body 150 may be a structural portion of the secondary vehicle 104 configured to hold or otherwise be coupled with payload 154. In some examples, the body 150 is connected to a payload release assembly to facilitate separation of the payload 154 from the secondary vehicle 104. For example, a payload release assembly may include articulable feature, such as doors, latches, and so on that are configured to transition between a first secure configuration and a second release configuration to separate the payload 154 from the body 150. Control features 152 may be connected or mounted to the body 150 to control an orientation or position of the secondary vehicle 104 during travel of the secondary vehicle 104 between the primary vehicle 102 and the drop location. For example, control features 152 may include fans or components configured to move air, such as an airfoil that rotates, and thereby produces a lift force relative to the body 150 of the secondary vehicle 104. Control systems 116 of the secondary aircraft 104 may be contained within or connected to the body 150 of the secondary vehicle 104.

The control systems 116 of the secondary vehicle 104 may include, for example, communications system 134, propulsion control 135, sensor system 136, flight control 137, path planning 138, safety system 139, actuator control 140, payload management 142, and/or various other modules as may be appropriate for a given application. The communications system 134, the propulsion control 135, the sensor system 136, the flight control 137, the path planning 138, the safety system 139, the actuator control 140, and the payload management 142 may be similar to corresponding systems described above in relation to the control systems 114. It will be appreciated that the communications system 134, the propulsion control 135, the sensor system 136, the flight control 137, the path planning 138, the safety system 139, the actuator control 140, and the payload management 142 are shown for purposes of illustration, and that is some cases, one or more of the foregoing modules may be omitted, for example, as may be the case when a given function is performed at the primary vehicle 102. The control systems 116 of the secondary vehicle 104 may be implemented by various hardware modules. In some implementations, various components of the control systems 116 may be combined into a single component and the control systems 116 may be implemented by any number of hardware components including SOC hardware, various processors, controllers, and programmable logic. Various hardware modules may be interconnected by a communications bus, which may be implemented using a CAN standard. In some implementations, some modules of the control systems 116 may be implemented using computing resources not located within the secondary vehicle 104. For example, path planning 138 may be implemented by a ground-based computing system in communication with the secondary vehicle 104. In other examples, path planning 138 and actuator control 140 may be implemented by hardware on the primary vehicle 102 in communication with the secondary vehicle 104.

Communications systems 134 may comprise transmitters and receivers that enable the secondary vehicle 104 to send and receive information using various communications protocols. For example, the communications systems 134 may enable the secondary vehicle 104 to communicate with the primary vehicle 102, user devices, other UAV systems, and the like. The communications system 134 may include transmitters and receivers for various sensing modalities, including CDMA, GSM, various cellular standards (e.g., 3G/4G/5G), long-term evolution (LTE), WiFi, Bluetooth, and custom line of sight and mesh protocols that may allow the secondary vehicle 104 to communicate with other AVs.

The sensor system 136 may include various sensors configured to gather different types of information about the environment of the UAV system 100 and/or the secondary vehicle 104. For example, the sensor system 136 may include a GPS, IMU, dynamic pressure sensors, static pressure sensors, air temperature sensors, proximity sensors, and other sensors. For example, the sensor system 136 may include visual or range finding sensors, such as stereo cameras, Lidar (light detection and ranging), time-of-flight Lidar, and the like.

Path planning 138 may use information gathered by the communications systems 134 and/or the sensor system 136 to plan a path for the secondary vehicle 104 from the primary vehicle 102 to a drop location. In some implementations, path planning 138 may also receive information from a user device, a map database, or other locations to determine a drop location based on an initial delivery location and the received information. In some examples, path planning 138 may also determine the drop location based on data gathered by the sensor system 136. For example, path planning 138 may receive an initial delivery location encompassing a geographic area. Path planning 138 may receive data from the sensor system 136 (e.g., visual data from stereo cameras) regarding the geographic area of the initial delivery location and may then select a drop location within the initial delivery location using the visual data. For example, path planning 138 may analyze the visual data to find a flat area free from obstacles or obstructions to serve as the drop location.

Path planning 138 may further coordinate with, for example, actuator control 140 and/or the communications system 134 to control the relative speed, position, and orientation of the secondary vehicle 104. Further, path planning 138 may implement obstacle avoidance as the secondary vehicle 104 travels between the primary vehicle 102 and the drop location. Safety system 139 may perform functions substantially analogous to those described in relation to the safety system 132. For example, the safety system 139 may monitor operations of the UAV system 100 and determine when a failure event has occurred. The safety system 139 may be configured to deploy one or more mitigation measures based on a detected type of safety event and severity, for example, with respect to the secondary vehicle 104. For the sake of non-limiting illustration, the safety system 139 may be configured to detect an event in which the tether 112 becomes trapped or entangle, and thereby inhibits the operation of the UAV system 100. In this example, the safety system 139 may be configured to cause a release of the secondary vehicle 104 from the tether 112 in order to allow the primary vehicle 102 to maintain flight.

Actuator control 140 may, in various examples, include actuators that control various moving parts of the secondary vehicle 104, such as rudders, elevators, control features 152, and other control structures of the secondary vehicle 140. The actuator control system 140 may change the state of any actuators of the secondary vehicle 104 and may report the current state of any actuators to other components of the control systems 116. Further, actuator control 140 may receive communications from other components of the control systems 116 to change the state of the actuators to cause movement of the secondary vehicle 104. For example, actuator control 140 may receive communications from path planning 138 to change orientation of control features 152 of the secondary vehicle 104 to control motion of the secondary vehicle 104.

Payload management 142 may perform functions related to the payload 154. For example, payload management 142 may control release of the payload 154 at the drop location. In some examples, payload management 142 may receive communications from path planning 138 to release the payload 154 at the drop location.

Propulsion control 135 may perform functions substantially analogous to those described in relation to the propulsion control 128 of the control system 114. For example, propulsion control 135 may control force exerted by any engines or other propulsion or lift mechanism included in the secondary vehicle 104 (e.g., by adjusting the speed of propellers mounted on a propeller powered vehicle). Propulsion control 135 may also monitor an amount of fuel or battery power remaining on the secondary vehicle 104. Flight control 137 may perform functions substantially analogous to those described in relation to the flight control 124 of the control system 114. For example, the flight control 137 may store a flight plan and/or trajectory of the secondary vehicle 104, and provide instructions to control systems of the primary vehicle 102 and/or the secondary vehicle 104 to execute the flight plan. The flight controller 137 may receive data from the communications system 134 and the sensor system 136 to continuously compute the location, speed, and heading of the secondary vehicle 104, including with respect to the primary vehicle 102. The flight controller 137 may combine location information with the flight plan and determine what, if any, changes or adjustments may be made to keep the secondary vehicle 104 on a path specified in the flight plan, such as a path that is configured to cause the secondary vehicle 104 to reach a specified delivery target. In some cases, the flight control 137 may then send commands to other modules of the control systems 114, 116, such as the actuator control 140 and the propulsion control 135 to take action to adjust the orientation and speed of the secondary vehicle 104, or UAV system 100 more generally.

The control systems 116 and 114 may communicate using communications systems 118 and 134 of the control systems 116 and 114, respectively. Further, in some embodiments, the control systems 114 and 116 may be configured such that, when the secondary vehicle 104 is retained by (e.g., docked in) the primary vehicle 102, the control systems 114 and 116 may form a physical connection, such as a communications bus. Such a physical connection may allow, for example, control systems 114 of the primary vehicle 102 to use information from the sensor system 136 of the secondary vehicle 104. For example, in some implementations, some sensors of the secondary vehicle 104 may be exposed and usable when the secondary vehicle 104 is retained within the primary vehicle 102. Accordingly, such sensors may be utilized by, for example, flight planning 122 or other components of the control system 114. In some examples, the secondary vehicle 104 may include stereo cameras, where data from the stereo cameras may be utilized by the primary vehicle 102 to, for example, localize into a map, determine a deployment location for the secondary vehicle 104, detect obstacles, and the like, while the secondary vehicle 104 is retained by the primary vehicle 102. In some implementations, the sensor systems 120 and 136 of the primary vehicle 102 and the secondary vehicle 104, respectively, may be fused to allow for more robust data and higher confidence in the drop location.

In various implementations, the tether 112 connecting the secondary vehicle 104 to the primary vehicle 102 may be controlled by a winch mechanism housed in the primary vehicle 102 or the secondary vehicle 104. In some examples, both the primary vehicle 102 and the secondary vehicle 104 may include winches to vary the length of the tether 112 (e.g., the distance between the primary vehicle 102 and the secondary vehicle 104 or the altitude of the secondary vehicle 104).

Figure 3:
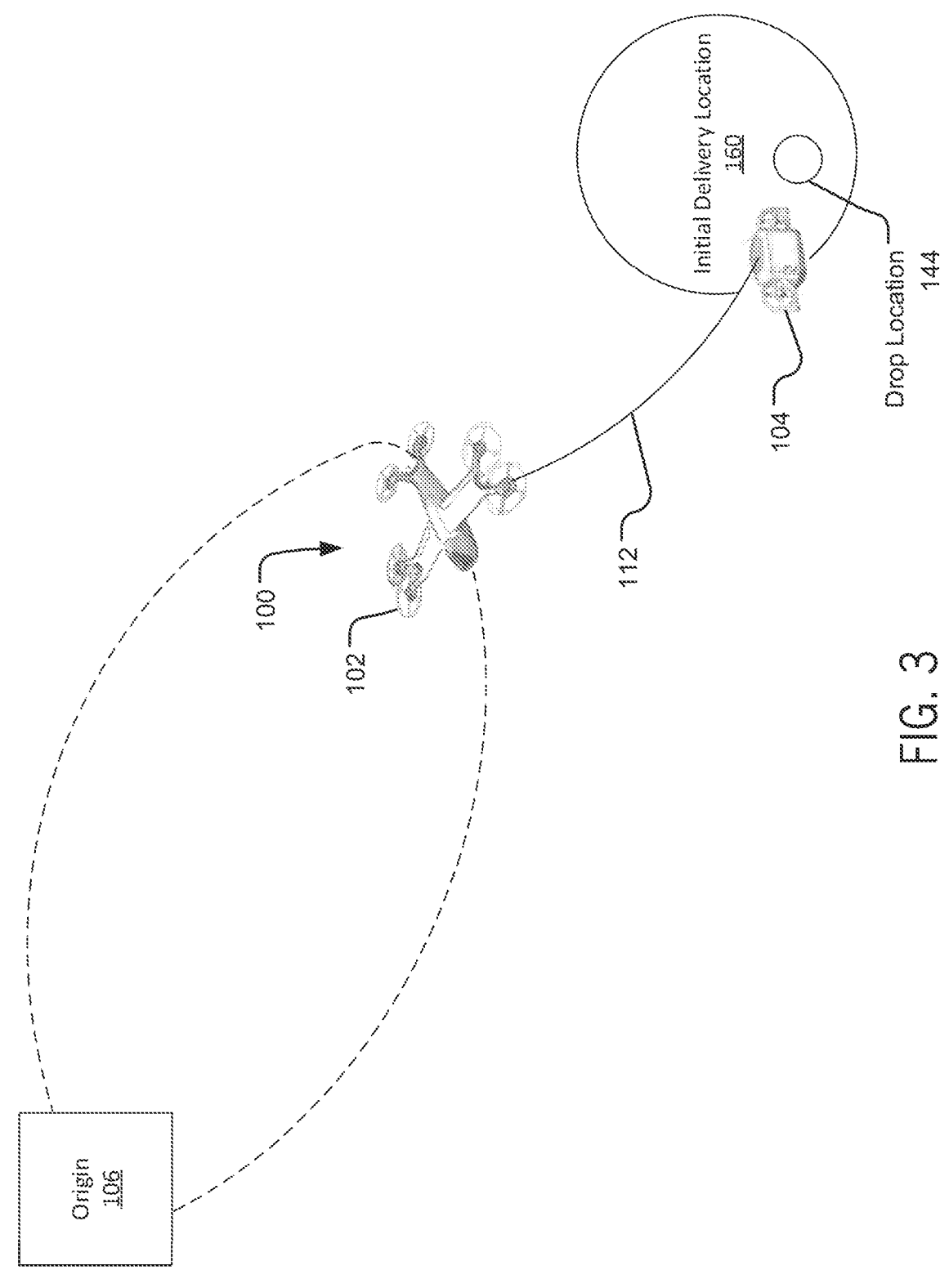
FIG. 3 illustrates an example flightpath of the primary vehicle and the secondary vehicle of FIG. 1.

FIG. 3 illustrates an example flightpath of the UAV system 100 including the primary vehicle 102 and the secondary vehicle 104. Generally, the UAV system 100 travels from an origin 106 with the secondary vehicle 104 contained within or removably attached to the primary vehicle 102. At a deployment location, the secondary vehicle 104 is released from the primary vehicle 102. In some implementations, the secondary vehicle 104 may be connected to the primary vehicle 102 by the tether 112 after deployment of the secondary vehicle 104 at the deployment location. The AV 100 may be provided with an initial delivery location 160 and may determine a drop location 144 based on the initial delivery location 160. The drop location 144 is generally the location where payload is delivered or dropped by the secondary vehicle 104. After delivery of the payload, the secondary vehicle 104 may return to the primary vehicle 102 and the UAV system 100 may continue to the origin 106, or another location such as a distribution center, retail location, or additional delivery locations.

As described herein, the origin 106 may be, in various examples, a warehouse, distribution center, retail location, or other fixed or mobile facility that facilitates the launch of the UAV system 100 and where the UAV system 100 may receive payload.

Figures 5, 6:
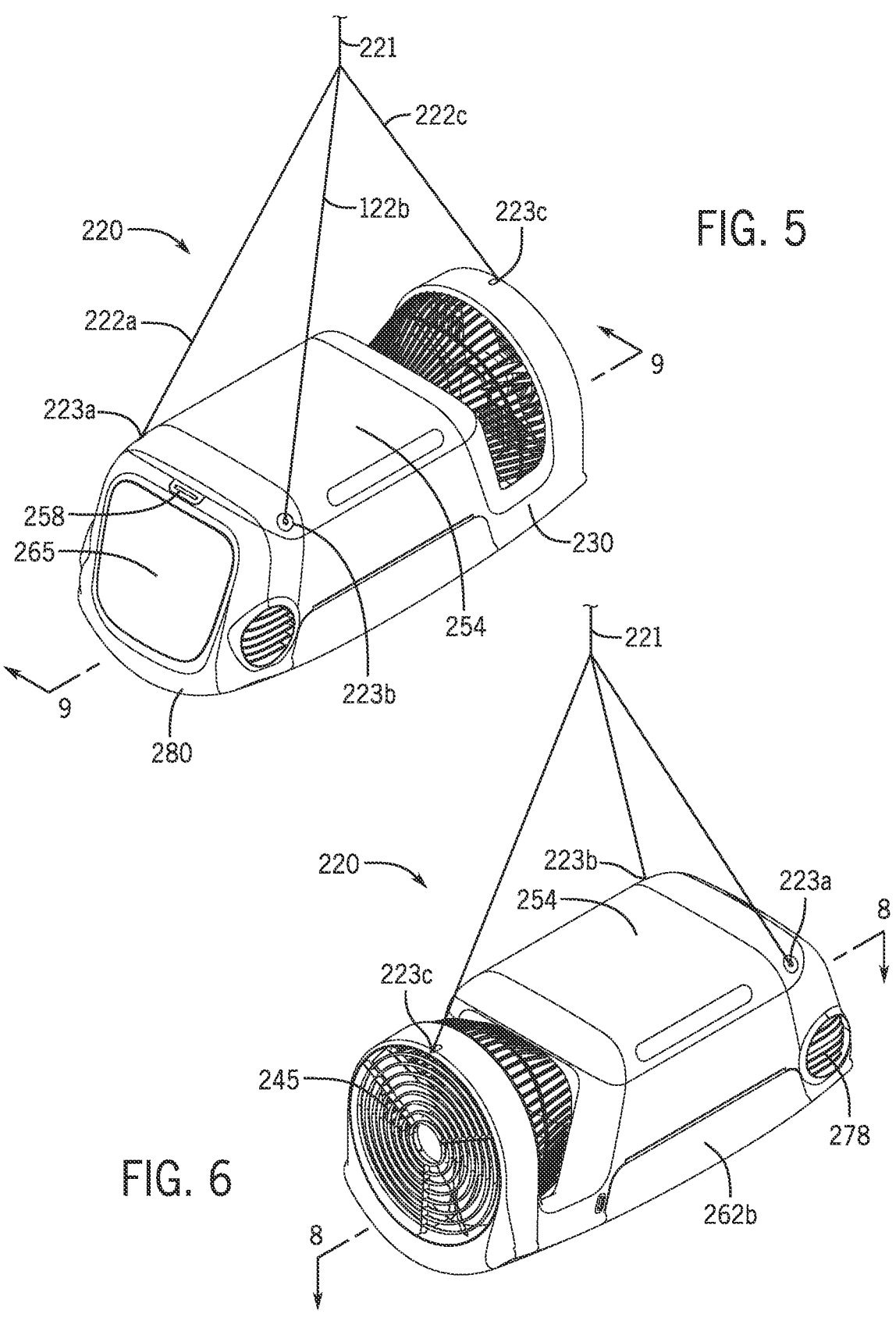
FIG. 5 depicts a front isometric view of the dependent UAV of FIG. 4A.
FIG. 6 depicts a rear isometric view of the dependent UAV of FIG. 4A.
Figure 7:
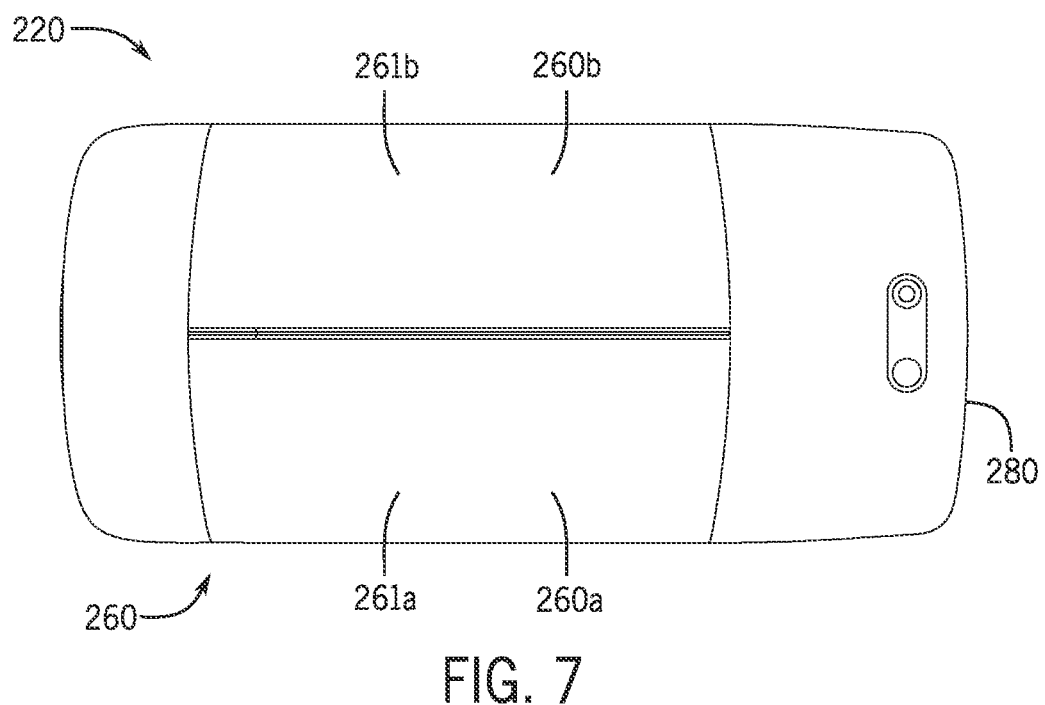
FIG. 7 depicts a bottom view of the dependent UAV of FIG. 4A.

The initial delivery location 160 may be provided to the UAV system 100 for flight planning. The initial delivery location 160 may be obtained with an order. For example, where a customer device 108 is used to place an order, the initial delivery location 160 may be based on an address given by the customer, a location of the customer device 160, or other selection (e.g., an area of a map selected using the customer device 108). For example, the initial delivery location 160 may be a circular area encompassing a radius around an estimated location of the customer device 108, which may be obtained by, for example, GPS location of the customer device 108, selection of location using the customer device 108, postal address, GPS coordinates, location name, or other information provided by the customer via the customer device 108. In some implementations, a location may be provided by the customer device 108 to a ground based computing system, which may then communicate initial delivery location 160 to the UAV system 100. In some implementations, the customer device 108 may directly communicate a delivery location to the UAV system 100 and may update the initial delivery location 160 while the UAV system 100 is in a process of delivering the payload. A mobile application presented on the customer device 108 (e.g., as shown in FIG. 5) may be used to communicate the initial delivery location 160 and/or the drop location 144 from the customer device 108 to the AV 100.

The deployment location is generally the location where the secondary vehicle 104 is released from the primary vehicle 102 to complete the delivery. The deployment location may be chosen based on the initial delivery location 160 (e.g., deployment location may be at a predetermined distance from the initial delivery location 160). The deployment location may also be coincident with a change in direction of the primary vehicle 102 such that the secondary vehicle 104 is deployed from the primary vehicle 102 as the primary vehicle 102 changes direction, setting a deployment trajectory for the secondary vehicle 104 targeting the drop location 144.

The drop location 144 may be provided to the UAV system 100 or may be determined by the UAV system 100 during delivery of the payload. For example, the drop location 144 may be provided by the customer device 108 using a mobile application (e.g., user interfaces 304 and 306). A map or photograph may be provided to the user, and the user may select a location on the map as the drop location 144. The location may then be communicated to the UAV system 100 as the drop location 144. In some examples, the drop location 144 may be provided to the secondary vehicle 104 using a delivery target, such as a visual target, radiofrequency beacon, or other targets detectable by one or more sensing modalities of the sensor system 136. For example, a physical visual target may be placed on the ground within the initial delivery location 160 to indicate the drop location 144. Visual sensors (e.g., cameras) of the secondary vehicle 104 and/or the primary vehicle 102 may detect the visual target and use the visual target as the drop location 144 for the payload.

The drop location 144 may also be determined by the UAV system 100 during delivery. For example, the sensor system 136 of the secondary vehicle 104 may assess the topography, obstacles, and other characteristics of the initial delivery location 160 during delivery. Path planning 138 of the secondary vehicle 104 may include instructions to select a drop location 144 based on the characteristics of the initial delivery location 160. For example, where the initial delivery location 160 includes buildings, automobiles, and other obstacles, the secondary vehicle 104 may select a drop location 144 more than a predetermined distance from the obstacles and with a relatively flat topography.

FIGS. 4A-4E shows a system 200 including a primary UAV 202 a dependent vehicle 220. The system 200 may be substantially analogous to the system 100 described above with reference to FIGS. 1-3. For example, the primary UAV 202 may be substantially analogous to the primary vehicle 102 and include modules similar to, and/or otherwise may be capable of executing the functionality of, the communications system 118, the sensor system 120, the flight planning module 122, the flight control 124, the actuator control 126, the propulsion control 128, the payload management module 130, the safety system 132, and/or other modules of the control system 114. As a further example, the dependent vehicle 220 may be substantially analogous to the secondary vehicle 104 and include modules similar to, and/or otherwise may be capable of executing the functionality of, the communications system 134, the propulsion control 135, the sensor system 136, the flight control 137, the path planning module 138, the safety system 139, the actuator control 140, the payload management module 142 and/or other modules of the control system 116. In this regard, it will be appreciated that various functions of the primary UAV 202 and the dependent UAV 204 described herein below with respect to the system 200 may be performed on one or more or all of the modules and system described with respect to FIG. 1-3 without limitation.

For purposes of illustration, FIGS. 4A-4E show the primary UAV 202 may include a combination fixed-wing and variable rotor propulsion system. One example of the primary UAV 202 is depicted in FIGS. 4A-4E for purposes of illustration. It will be appreciated that other UAVs and vehicles, such as those which may carry out one or more of the functions of the primary UAV 202 described herein, may also be used. In the example of FIGS. 4A-4E, the primary UAV 202 may include a fuselage 203 and a primary UAV fixed wing 205 extending from the fuselage 203. Below the primary UAV fixed wing 205, side rotor supports 206a, 206b may extend along a generally perpendicular direction relative to the primary UAV fixed wing 205. At opposing ends of each of the side rotor supports 206a, 206b, side rotors 207 may be provided for a total a four side rotors 207. The side rotors 207 may rotate about an axis generally perpendicular with a ground surface. Extending from the fuselage 203 includes forward and back rotor supports 208a, 208b. Arranged at the respective ends of the forward and back rotor supports 208a, 208b are articulable rotors 209. The articulable rotors 209 may be configured to articulate between a generally horizontal and a generally vertical configuration, based on a configuration of the primary UAV 202 being in a hover or forward-flight mode. Extending from the back of the fuselage 203 is a tail 204. The tail 204 may be an inverted V-shaped feature, which may cooperate with the primary UAV fixed wing 205 to promote stability.

The fuselage 203 may further define a bay 210 along a lowermost portion of the primary UAV 202. The bay 210, as shown in FIGS. 4A-4E, may be configured to receive and secure the dependent vehicle 220 therein and/or may be configured to receive a payload, such as a package, within the bay 210. As described herein, the primary UAV 202 may be substantially any type of device, and that the bay 210 may be optional.

FIGS. 5-11 show an example of the dependent vehicle 220. The dependent vehicle 220 may include substantially any autonomous or semiautonomous unmanned aerial vehicle that is dependent on the primary UAV 202. For example, and as described further below, the dependent vehicle 220 may maintain flight, move, and function (e.g., to deliver and release a payload or package), dependent or based in part on the operation of the primary UAV 202. In this regard, the primary UAV 202 may be partially or fully responsible to maintain the UAV system 200 airborne, and thus the dependent vehicle 220 may remain airborne based on the operation of UAV 202. Further, the primary UAV 202 may be partially or fully responsible to move the UAV system 200 along a flight path, and thus the dependent vehicle 220 may move along the flight path as a function of the movements of the primary UAV 202.

The dependent vehicle 220 may be dependent on the operation of the primary UAV 202, and configured to hold and release a payload or package. A payload or package may include substantially any item that may be transported by an UAV, including without limitation parcels, packages, envelopes, cartons, or the like, which may include a variety of items, such as household items, food, medicine, toys, and so on. The dependent vehicle 220 may receive or be loaded with the payload at a shipping site. The dependent vehicle 220 may hold the payload during transport to a delivery site. The dependent vehicle 220 may release the payload at the delivery site for deliver and/or otherwise provide access to customer to the payload.

The dependent vehicle 220 is shown in FIGS. 5-11 as having a body 230. The body 230 may define a payload holding region 232. The payload holding region 232 may be a fully enclose region of the body 230. In other cases, some or all of the payload holding region 232 may be defined along an external surface and/or otherwise along a surface that that remains exposed to the environment during operation of the dependent vehicle 220. The body 230 may be an integrally formed or multi-component structure that defines a main structure of the dependent vehicle 220. The body 230 may be formed from various materials, including high-strength injection molded plastics, synthetics, and/or composite materials, which may be reinforced. The body 230 may define an aerodynamic outer shape of the dependent vehicle 220. In the example of FIGS. 5-11, the body 230 may have a generally rectangular cross-section. The body 230 may be configured to house and shield the payload in the payload holding region 232. The body 230 may further be configured to receive, couple with, and/or provide a mounting for various components and subsystems of dependent vehicle 220), including various coupling mechanisms, steering mechanisms, and so on, as described below.

Figure 10:
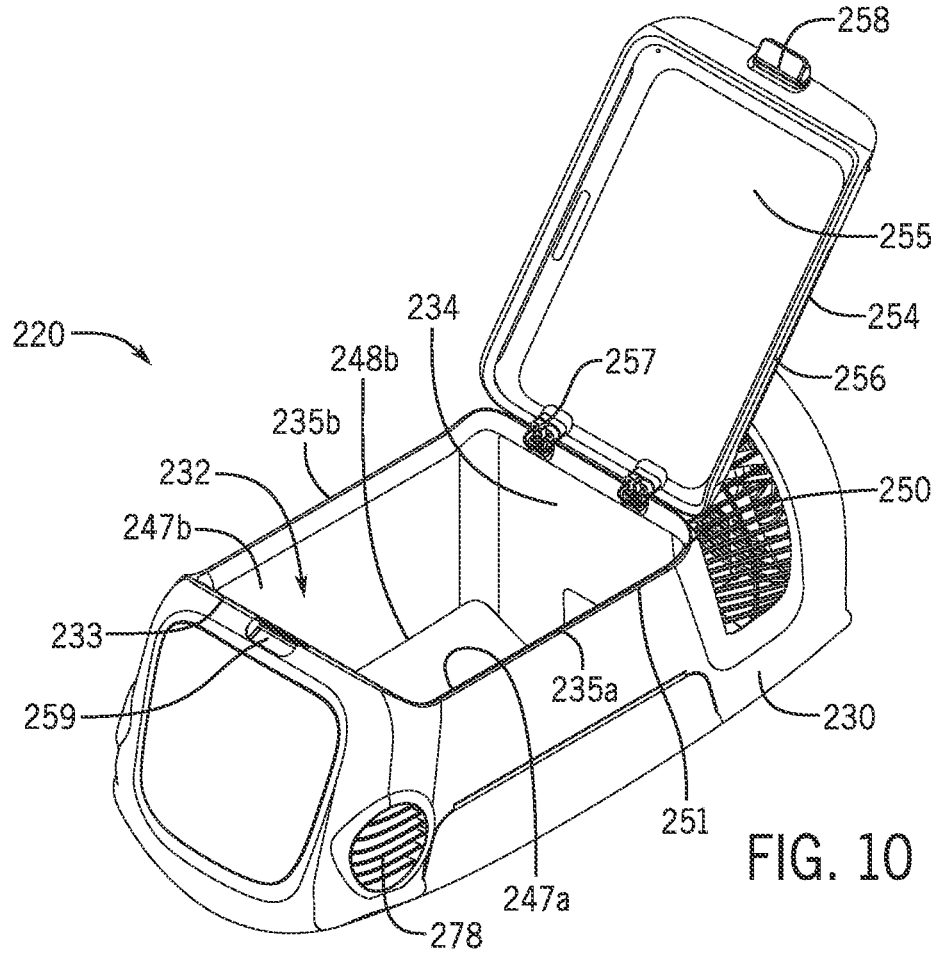
FIG. 10 depicts the dependent UAV of FIG. 5 in a loading configuration, in which a loading cover is shown open.

As shown in FIG. 10, the body 230 may include a variety of wall portions that cooperate to define features for receiving a payload and/or coupling with or mounting components of the dependent vehicle 220. For example, the body 230 may include a front wall portion 233, a back wall portion 234, and side wall portions 235a, 235b. The front wall portion 233, the back wall portion 234, and the side wall portions 235a, 235b may be sections or pieces of the body 230 that are coupled with one another to define the shape of the body 230. In some cases, the front wall portion 233, the back wall portion 234, and the side wall portions 235a, 235b may be partially or fully integrally formed components, for example from injection molding or 3D printing, whereas in other cases, the respective wall portions are individual components that are attached to one another, such as with fasteners or the like.

Figure 9:
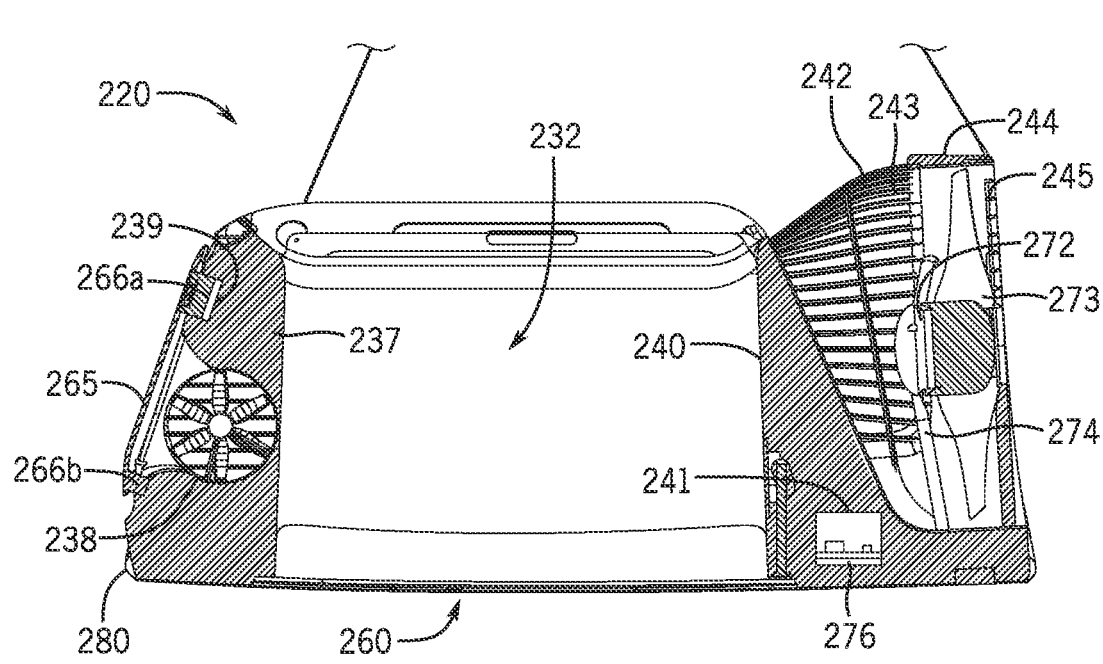
FIG. 9 depicts a cross-sectional view of the dependent UAV of FIG. 4A, taken along line 9-9 of FIG. 5.

As shown in FIGS. 9 and 10, the front wall portion 233, the back wall portion 234, and the side wall portions 235a, 235b may cooperate to define the payload holding region 232. For example, the front wall portion 233 may include a first payload surface 237, the back wall portion 234 may include a second payload surface 240, and the side wall portions 235a, 235b may include respective third and fourth payload surfaces 247a, 247b. The first payload surface 237, the second payload surface 240, the third payload surface 247a, and the fourth payload surface 247b may each be internal surfaces of the body 230 that cooperate to define payload holding region 232 therein. The first payload surface 237, the second payload surface 240, the third payload surface 247a, and the fourth payload surface 247b may be configured to engage or contact a sample payload, including being sized and shaped to match or substantially conform to the dimension of a payload.

Figure 11:
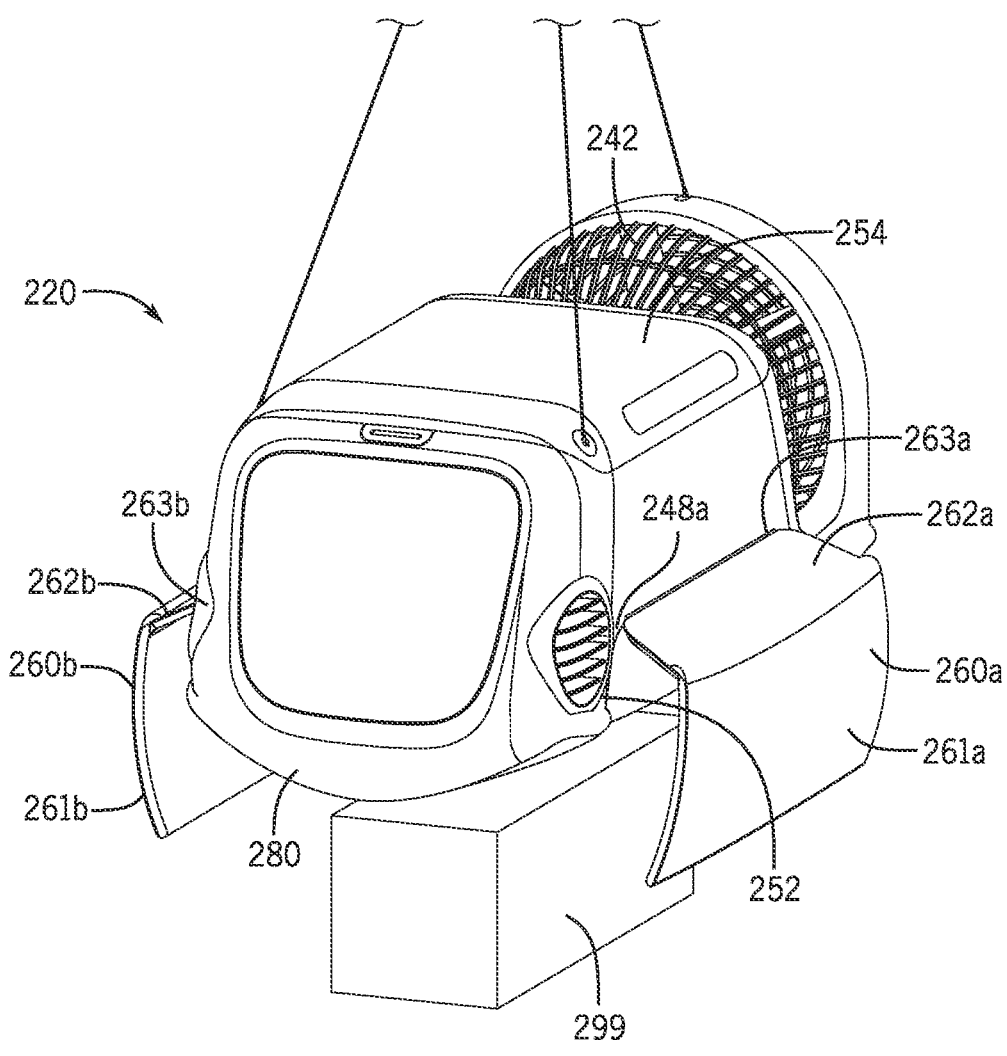
FIG. 11 depicts the dependent UAV of FIG. 5 in a delivery configuration, in which a delivery cover is shown open.

The front wall portion 233, the back wall portion 234, and the side wall portions 235a, 235b may cooperate to define a loading opening 250. The loading opening 250 may be at a topmost portion of the dependent vehicle 220 and extend into the payload holding region 232 for the loading of payloads therein. For example, each of the first payload surface 237, the second payload surface 240, the third payload surface 247a, and the fourth payload surface 247b may cooperate to form a portion of a loading opening rim 251. The loading opening rim 251 may be a continuous rim that surrounds the loading opening 250. The loading opening rim 251 may be configured to engage or seat a cover, as described below. Further, the front wall portion 233, the back wall portion 234, and the side wall portions 235a, 235b may cooperate to define a delivery opening 252. The delivery opening 252 may be arranged opposite the loading opening 250. The delivery opening 252 may be larger than the loading opening 250, which may facilitate delivery and release of the payload from the dependent vehicle 220. In some cases, each of the first payload surface 237, the second payload surface 240, the third payload surface 247a, and the fourth payload surface 247b may cooperate to form a portion of a contoured surface for receiving doors, a cover, a hatch, and/or mechanism to facilitate the release of the payload from the payload holding region 232 via the delivery opening 252. In one example, as shown in FIGS. 10 and 11, the third and fourth payload surfaces 247a, 247b may define delivery cover receiving features 248a, 248b, which may be adapted to receive delivery doors and to provide an enlarged region for payload exit from the payload holding region 232.

The front wall portion 233, as shown with respect to FIG. 9, may also include various other surfaces that are configured to receive components and subassemblies to support the operation of the dependent vehicle 220. For example, the first wall portion 233 may include a side thruster cavity 238, a thruster panel engagement feature 239, and a bumper 280 among other features. The side thruster cavity 238 may be defined by a contoured surface that defines a generally cylindrical space through a lateral dimension of the first wall portion 233. The side thruster cavity 238 may extend through a complete thickness of the body 230 along the lateral dimension in order to place one or more components for a side thruster in the first wall portion 233 that operates to provide thrust on both opposing lateral sides of the dependent vehicle 220. The thruster panel engagement feature 239 may be a notch or other element that is configured to engage with a front panel of the dependent vehicle 220, such as a front access panel that covers the side thruster cavity 238. The bumper 280 may define a forward most edge or surface of the dependent vehicle 220. In some cases, the bumper 280 may be defined from a different, optionally resilient material, as compared with a main material composition of the front wall portion 233. In this regard, the bumper 280 may allow the dependent vehicle 220 to contact obstacles, such as a wall, during delivery without substantially damaging the dependent vehicle 220 or the obstacle.

Figure 8:
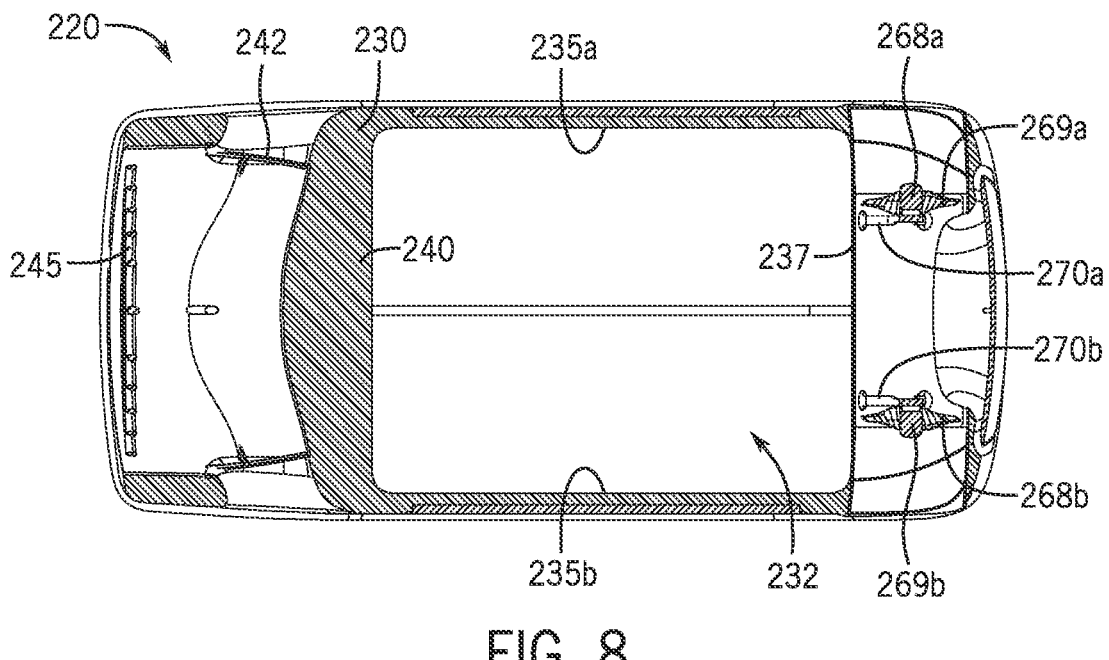
FIG. 8 depicts a cross-sectional view of the dependent UAV of FIG. 4A, taken along line 8-8 of FIG. 6.

The back wall portion 234, as shown in FIGS. 5, 8, and 9, may also include various other surfaces that are configured to receive components and subassemblies to support the operation of the dependent vehicle 220. For example, the back wall portion 234 may include a controls cavity 241, rear thruster cage 242, an intake grate 243, and a band 244, among other features. The controls cavity 241 may include an optional pocket or space within the back wall portion 234 that is configured to receive electrical components (e.g., controller or PCB 276) that control one or more operations of the dependent vehicle 220. It will be appreciated that the controls cavity 241 is shown defined with the back wall portion 234 in FIG. 9 for purposes of illustration; in other cases, the controls cavity 241 may be positioned in another region of the dependent vehicle 220 and/or be defined a different wall portion based on a given application. The rear thruster cage 242 may be defined by a series of aerodynamic fins or ribs that extend from a rearward section of the back wall portion 234. The fins or ribs of the rear thruster cage 242 may define the intake grate 243. The intake grate 243 may be arranged forward of the rear thruster and permit the intake of airflow to the rear thruster. The rear thruster cage 242 may extend integrally to the band 244. The band 244 may define a structural landing or connection point for the fins or ribs of the rear thruster cage 242. The band 244 may further be arranged generally along a rotational component of the rear thruster.

The dependent vehicle 220 of FIGS. 5-11 may further include a loading cover 254. The loading cover 254 is configured to control access to the payload holding region 232 for loading of the payload therein. For example, the loading cover 254 may generally shield the payload holding region 232 from an external environment. The loading cover 254 may be selectively opened and closed in order to allow the payload holding region 232 to receive a payload. To facilitate the foregoing, the loading cover 254 may include or otherwise be associated with a cover portion 255, a lip portion 256, a hinge 257, and a closing feature 258. For example, and as shown in FIG. 10, the cover portion 255 may be generally defined by a substantially planar region that is configured to span and cover the loading opening 250. A lip portion 256 may extend from the cover portion 255. For example, the lip portion 256 may extend from a periphery of the cover portion 255 on all or a subset of sides of the cover portion 255. The lip portion 256 may be configured for engagement with the loading opening rim 251. For example, the lip portion 256 may include a ledge, a groove, and/or other feature that may mate with, such as overlap with, the loading opening rim 251 when the loading cover 254 is closed over the payload holding region 232. In this regard, the loading cover 254 may operate to shield the payload holding region 232 from an external environment and generally block moisture and debris from entering the payload holding region 232. To facilitate the movement of the loading cover 254, the hinge 257 may be configured to define a pivotal coupling between the body 230 and the loading cover 254. The closing feature 258 may include a latch or other mechanism that is seatable with a closing feature receiving groove 259 of the body 230, opposite the hinge 257.

The dependent vehicle 220 of FIGS. 5-11 may also include a delivery cover 260. The delivery cover 260 is configured to control access to the payload holding region 232 for release of a payload contained therein. For example, the delivery cover 260 may generally shield the payload capacity from an external environment. The delivery cover 260 may provide a structural shelf or support for the payload held within the payload holding region 232. For example, the payload may rest on the deliver cover 260 within the payload holding region 232 during transport to the delivery location. The delivery cover 260 may be selectively opened in order to release the payload from the payload capacity. To facilitate the foregoing, the delivery cover 260 may include doors 260a, 260b. With reference to the door 260a, this feature may include a bottom panel 261a and a side panel 262a. The bottom panel 261a and the side panel 262a may be integrally constructed components that cooperate to define an L-shaped feature that covers a portion of the delivery opening 252. In a closed configuration, the side panel 262a may be arranged on a side of the body 230 and the bottom panel 261a may be arranged along a bottommost surface of the body 230. For example, the door 260a may fit into and engage with the delivery cover receiving features 248a, in one example. A hinge feature 263a may be provided to establish a pivotal relationship between the door 260a and the body 230. This may allow the door 260a to transition between a closed configuration, as shown in FIGS. 9 and 10, in which the door 260a covers a portion of the delivery opening 252, and in open configuration, in which the door 260a is articulated to reveal the delivery opening 252 and cause the release of a payload held in the payload capacity. The door 260b may be substantially analogous to the door 260a and include a bottom panel 261b, a side panel 262b, and a door hinge 263b; redundant explanation of which is omitted here for clarity.

The dependent vehicle 220 may include various components that operate to allow the dependent vehicle 220 to steer relative to the primary UAV 202. In the present example, the dependent vehicle 220 includes side thrusters 268a, 268b and a rear thruster 272. The side thrusters 268a, 268b and the rear thruster 272 may cooperate to provide the dependent vehicle 220 with multi-directional control. The side thrusters 268a, 268b and/or the rear thruster 272 may be configured to contribute to the active steering or navigation of the dependent vehicle 220. As shown in FIG. 8, the side thruster 268a includes a rotor 269a and a side thruster mount 270a. The side thruster mount 270a may extend from the front wall portion 233 and into the side thruster cavity 238. The side thruster mount 270a may provide a rotational mount for the rotor 269a within the side thruster cavity 238. In this regard, and as shown in FIG. 8, the rotor 269a may be configured to rotate within the side thruster cavity 238 without contacting the front wall portion 233. The side thruster mount 270a may provide both a structural and an electrical connection for the rotor 269a within the side thruster cavity 238. The side thruster 269b may also include a rotor 269b and a side thruster mount 270b; redundant explanation of which is omitted here for clarity. Analogously, the rear thruster 272 may include a rear rotor 273 and a rear rotor mount 274, as shown in FIG. 9. The rear rotor mount 274 may extend from the back wall portion 234. The rear rotor mount 274 may be configured to pivotally and electorally mount the rear rotor 273 within the rear thruster cage 242.

The side thrusters 268a, 268b and the rear thruster 272 may be shielded from debris and access while also open to the environment to allow the thrusters to provide lift and facilitate steering. For example, the dependent vehicle 220 may include an access panel 265 including mounts 266a, 266b. The access panel may be fitted over the side thruster cavity 238 and define a forward most surface of the dependent vehicle 220. Mounts 266a, 266b may extend from the access panel 265 for engagement with the front wall portion 233, such as for engagement at the thruster panel engagement feature 239, in order to secure the access panel 265 to the body 230. The side thrusters 268a, 268b may also be shielded by side thruster grates 278. The side thruster grates 278 may be positioned over respective ones of the side thrusters 268a, 268b. The side thrusters grates 278 may be adaptable to receive an airflow therethrough (e.g., such as that induced by the rotors 269a, 269b) in order to support steering of the dependent vehicle 220. Further, the rear thruster 272 may be shielded by an aft grate 245. The aft grate 245 may be positioned over and fitted with the band 244 in order to close the rear thruster 272 with the rear thruster cage 242. The aft grate 245 may be adapted to receive an airflow therethrough (e.g., such as that induced by the rear thruster 272) in order to support steering of the dependent vehicle 220.

Figure 4B:
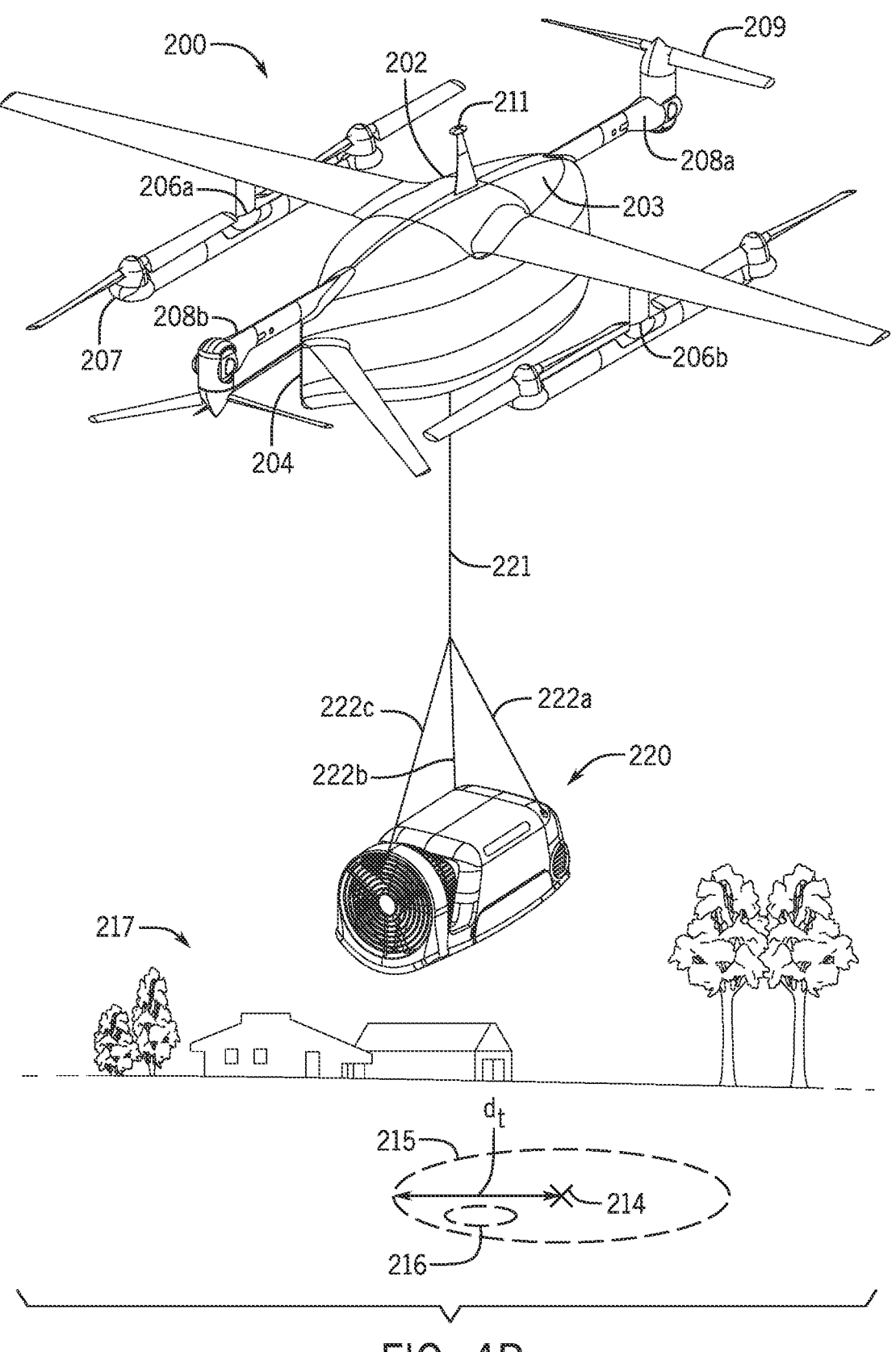
FIG. 4B depicts the primary UAV and the dependent UAV of FIG. 4A in a second configuration, in which the dependent UAV is deployed from the primary UAV.
Figure 4C:
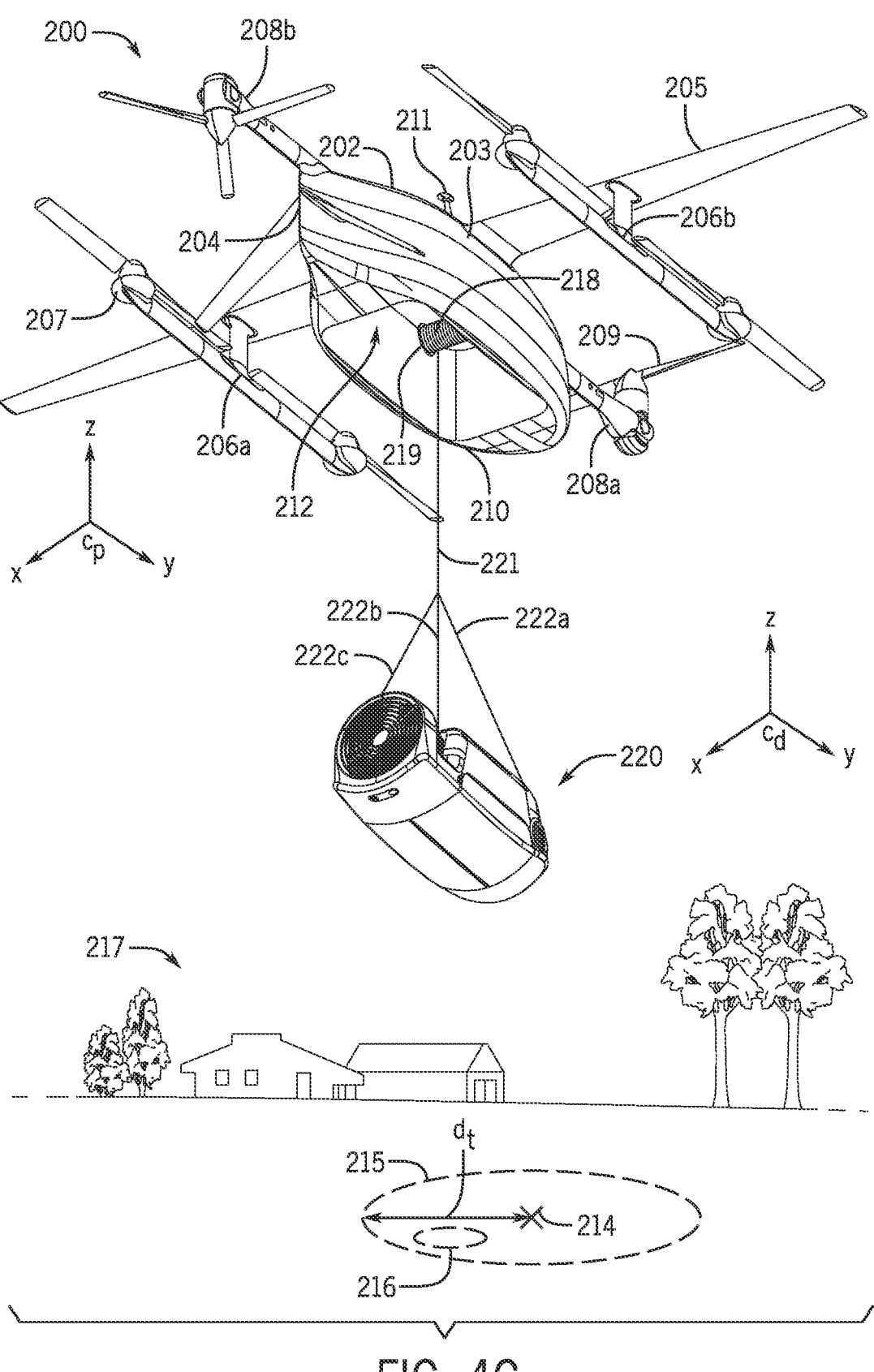
FIG. 4C depicts an underside of the primary UAV and the dependent UAV of FIG. 4A in the second configuration.

The dependent vehicle 220 and the primary UAV 202 may be coupled to one another using a coupling mechanism 221, as shown in FIGS. 4A-4E. The coupling mechanism or linking mechanism 221 may include a tether, rope, cable, and/or other component that operates to physically connect the dependent vehicle 220 and the primary UAV 202 to one another. The coupling mechanism 221 may have sufficient strength in order to suspend the dependent vehicle 220 from the primary UAV 202, including the payload of the dependent vehicle 220, without assistance or lift from the dependent vehicle 220. Further, the coupling mechanism 221 may have sufficient strength in order to pull or otherwise exert a force on the dependent vehicle 220, such as to cause an adjustment of the position of the dependent vehicle 220, as described herein. The coupling mechanism 221 may be configured to mechanically and/or electrically and/to communicatively couple the dependent vehicle 220 and the primary UAV 202. While many configurations of the coupling mechanism are possible and contemplated herein, FIGS. 4B and 4C show the coupling mechanism 221 including a first leg 222a, a second leg 222b, and a third leg 222c. The first, second, third legs 222a-222c may extend from a primary strand of the coupling mechanism 221 and connect to the dependent vehicle 220 at separate locations. For example, and as shown in FIG. 5, the first leg 222a may be connected to the dependent vehicle 220 at a first connection point 223a, the second leg 222b may be connected to the dependent vehicle 220 at a second connection point 223b, and the third leg 222c may be connected to the dependent vehicle 220 at a third connection point 223c. The three-point connection between the coupling mechanism 221 and the dependent vehicle 220 may stabilize the dependent vehicle 220. In other cases, more or fewer connections may be used. Additionally, any or all of the connection points 223a-223c may be configured for quick release of the coupling mechanism 221 from the dependent vehicle 220, which may facilitate maintenance, as well as allow for the emergency separation of the dependent vehicle 220 from the primary UAV 202.

The coupling mechanism 221 may be connected to the primary UAV 202 opposite the dependent vehicle 220. In one example, as shown in FIG. 4C, the coupling mechanism 221 may be connected to the primary UAV 202 using a retraction mechanism 218. The retraction mechanism 218 may include a spool 219 that is rotatable about an axis. The spool 219 may receive an end of the coupling mechanism 221. The spool 219 may be selectively rotated in order to extend or retract the coupling mechanism 221 from the primary UAV 202. The rotation of the spool 219 in this regard may cause the dependent vehicle 220 to be retracted and extended from the primary UAV 202.

In operation, the UAV system 200 may operate to deliver a payload to a delivery location. For example, the primary UAV 202 may carry the dependent vehicle 220 to a delivery location and cause the dependent vehicle 220 to release the payload at or adjacent to an intended target. With reference to the flow diagram of FIG. 12, a process 1200 is depicted for delivering a payload or product. At operation 1204, a first unmanned aerial vehicle is positioned within a threshold distance of the a delivery location. For example, and with reference to FIG. 4A, the primary UAV 202 is positioned within a threshold distance di of a delivery target 214. As shown in FIG. 4A, the delivery target 214 may be within an environment 217. The environment 217 may be an urban, suburban, rural or other environment. In some cases, the environment 217 may include various obstacles, such as the house and barn shown in reference to FIG. 4A. In other cases, power lines, retaining walls, porches, trees, and so on may be present. The threshold distance di of the delivery target 214 may define a radius 215 about the delivery target 214. The primary UAV 202 may be positioned within the threshold distance di by traversing a flight path to the delivery target 214, for example, by operation of the rotors 208a, 208b, 209. The primary UAV 202 may be positioned with the threshold distance di of the delivery target while also carrying the dependent vehicle 220. For example, as shown in FIG. 4A, the dependent vehicle 220 may be optionally received in and secured in the bay 210 of the primary UAV 202. The dependent vehicle 220 may hold a payload, such as the payload 299. As such, the primary UAV 202 may be positioned with the threshold distance di of the delivery target while carrying both the dependent vehicle 220 and the payload 299.

Figure 12:
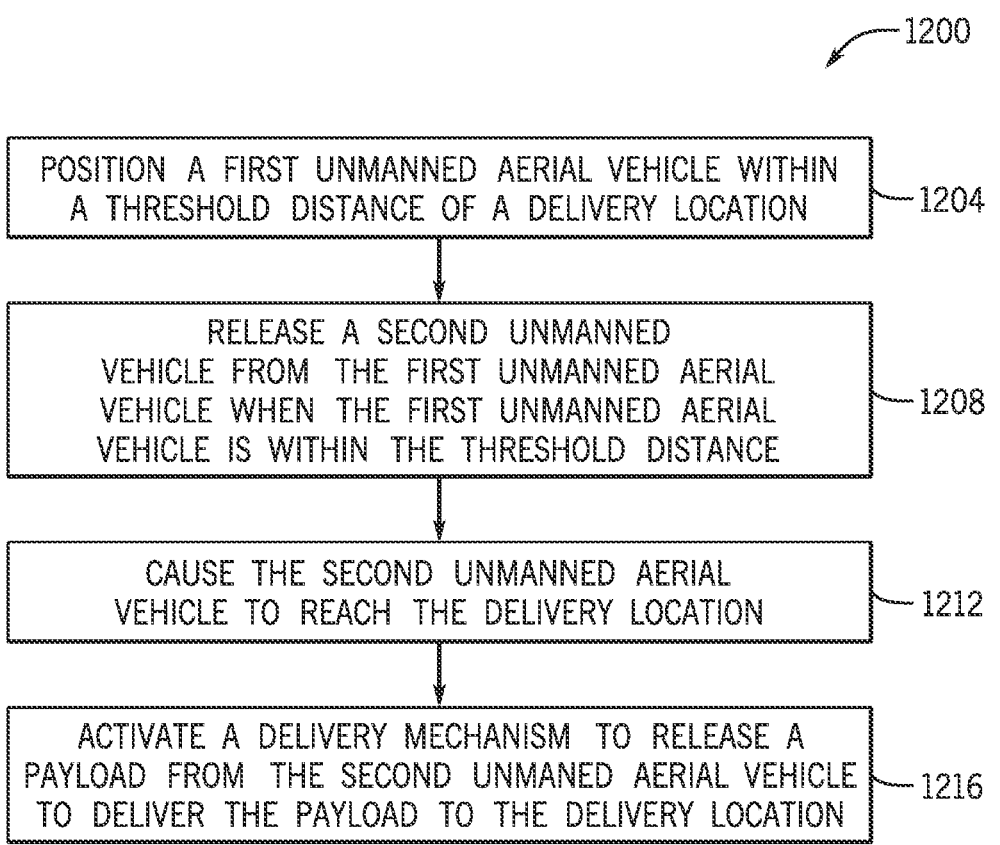
FIG. 12 depicts a flow diagram of a method for delivering a payload.

At operation 1208, shown in FIG. 12, a second aerial vehicle is released from the first unmanned aerial vehicle when the first unmanned aerial vehicle is within the threshold distance. For example, and as shown in FIGS. 4A and 4B, the dependent vehicle 220 may be released from the primary UAV 202. The dependent vehicle 220 may be released from the primary UAV 202 when the primary UAV 202 is within the threshold distance $d_t$, for example, as shown in FIG. 4C where the UAV system 200 may have a ground position 216 that is within the radius 215 defined by the threshold distance $d_t$. The dependent vehicle 220 may be released from the bay 210 of the primary UAV 202. For example, the retraction mechanism 218 may, in an initial state, have the coupling mechanism 221 substantially retracted, such that the coupling mechanism 221 is wound about the spool 219. The dependent vehicle 220 may therefore be secured in the bay 210 may the retraction mechanism 218. Additionally or alternatively, locks or other mechanism may secure the dependent vehicle 220 within the bay 210 of the primary UAV 202, particularly during a flight of the primary UAV 202 to the delivery target 214. In the configuration shown in FIGS. 4B and 4C, the dependent vehicle 220 may be released from the bay 210. For example, the retraction mechanism 218 may unwound the spool 219 and allow the coupling mechanism 221 to extend away from the primary UAV 202. This in turn may cause the dependent vehicle 220 to be lowered, such as being lowered toward the delivery target 214.

Figure 4D:
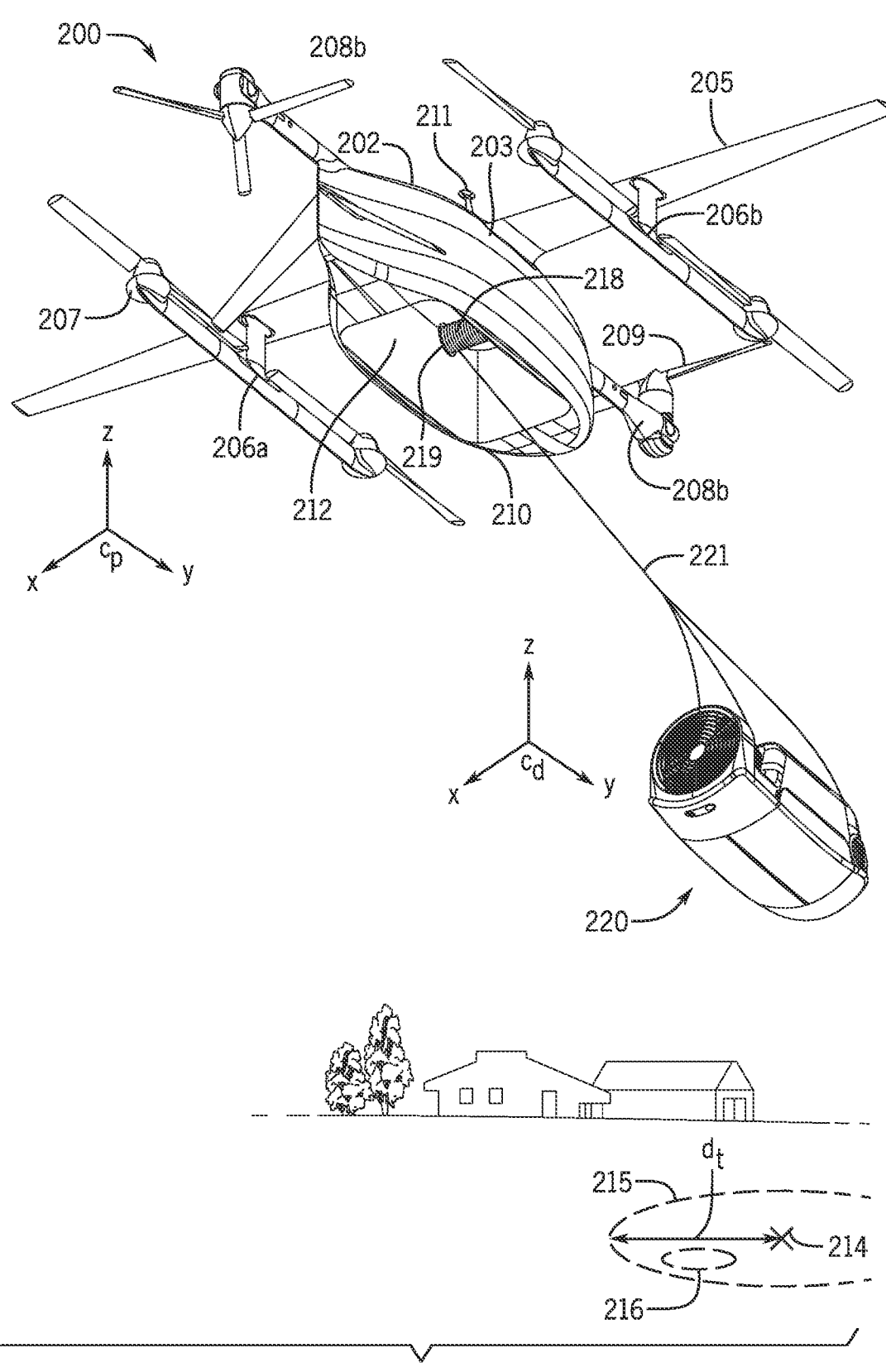
FIG. 4D depicts the primary UAV and the dependent UAV of FIG. 4A in a third configuration.
Figure 4E:
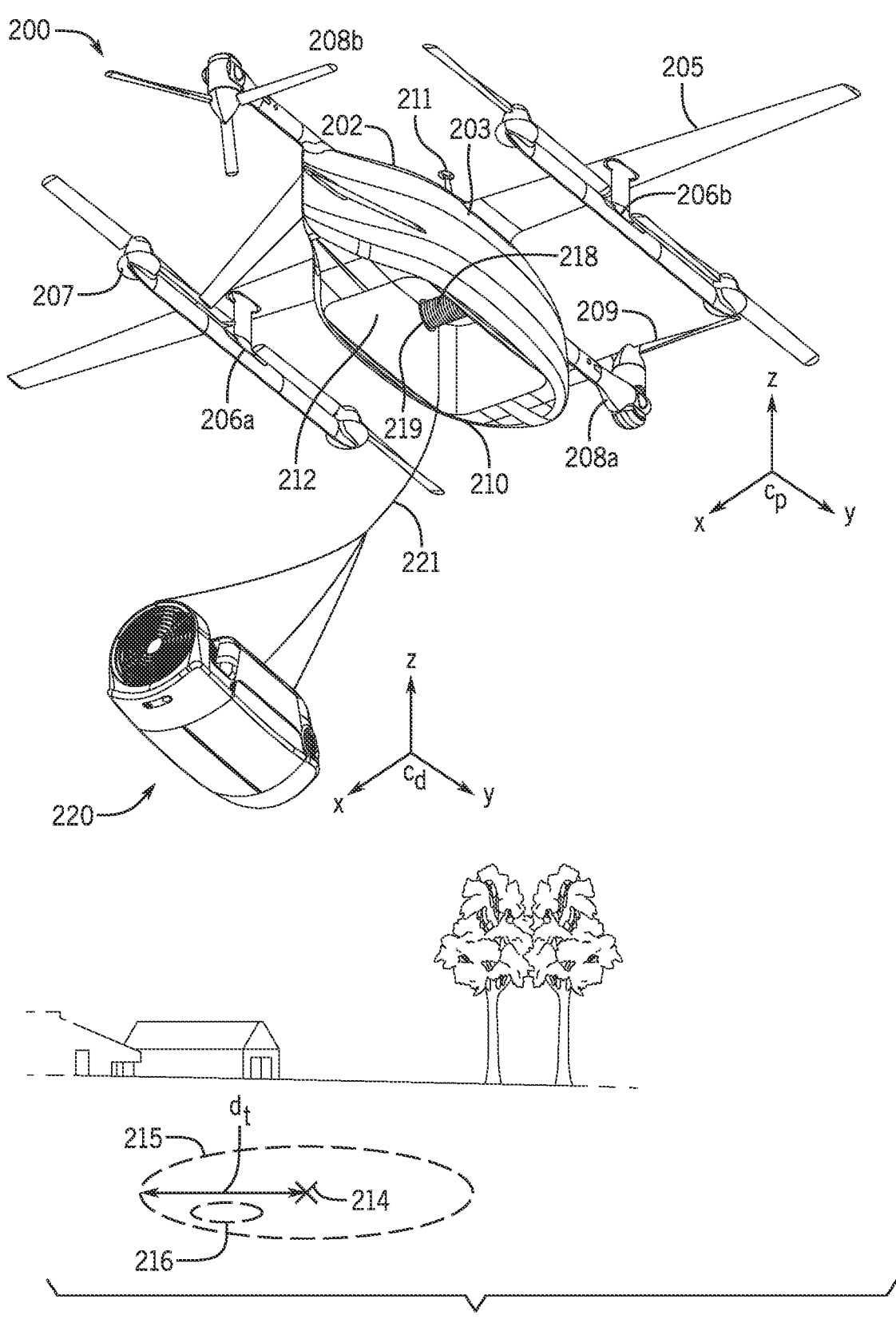
FIG. 4E depicts the primary UAV and the dependent UAV of FIG. 4A in a fourth configuration.

At operation 1212, shown in FIG. 12, the second unmanned aerial is caused to reach the delivery location. For example, and as shown in FIGS. 4D and 4E, the dependent vehicle 220 is caused to reach the delivery target 214. The dependent vehicle 220 may be caused to reach the delivery target 214 in a variety of manners. In some cases, the primary UAV 202 may operate to adjust a macro position of the dependent vehicle 220. For example, the primary UAV 202 may manipulate the macro position of the dependent UAV by generating a change in a flight characteristic that translates to a force applied to a mechanical coupling (e.g., the couplings 223a-223c) on the dependent vehicle 220. As illustrated in FIGS. 4D and 4E, the primary UAV 202 may move along a coordinate axis $c_p$ in the x, y, and/or z directions. The movement of primary UAV 202 in this regard may cause a corresponding movement of dependent vehicle 220. For example, a position, a speed, or a heading of the primary UAV 202 may be varied relative the coordinate axis $c_p$, which may in turn may impact at least one of a position, a speed, or a heading of the dependent vehicle 220 relative to a coordinate axis ca.

Additionally or alternatively, the dependent vehicle 220 may be configured to adjust the micro positions of the dependent vehicle 220 relative to the primary UAV 202. For example, more or more control features of the dependent vehicle 220 may be activated in order to directly change the positions, the speed, or the heading of the dependent vehicle 220. As one example, one or more or all of the side thrusters 268a, 268b, and/or the rear thruster 272 may be activated to directly steer the dependent vehicle 220. In some cases, the primary UAV 202 may adjust the macro positions of the dependent vehicle 220 in coordination with micro adjustments made by the dependent vehicle 220. In this regard, the primary UAV 202 and the dependent vehicle 220 may cooperate to cause the dependent vehicle 220 to reach the delivery target 214, including in situation in which the delivery target is adjacent obstacles, as described herein.

Additionally or alternatively, the dependent vehicle 220 may be caused to reach the delivery target 214, in part, by selectively timing the releasing of the dependent vehicle 220. For example, the dependent vehicle 220 may be selectively released from the primary UAV 202 based on a wind characteristics of the delivery target 214 or environment more generally. In some cases, this may involve releasing the dependent vehicle 220 based on an anticipated assist from the wind, or conversely an anticipate drag from the wind. Further, selectively releasing the dependent vehicle 220 may include releasing the dependent vehicle 220 once the primary UAV 202 is arranged at a particular position relative to a wind direction. Relatedly, the selective releasing of the primary UAV 202 may include releasing the dependent vehicle 220 based on a position of the primary UAV 102 relative to the delivery target 214.

Additionally or alternatively, the dependent vehicle 220 may be caused to reach the delivery target 214, in part, by traveling along a ground surface. Initially, the dependent vehicle 220 may be released from the primary UAV 102 and travel to a ground surface. For example, the dependent vehicle 220 may be manipulated using a tether or other mechanism in combination with one or more control features, as described herein. Upon reaching the ground, the dependent vehicle 220 may subsequently travel some distance to reach the delivery target. Traveling along the ground surface may occur with or without the dependent vehicle 220 being coupled to the primary UAV 102 via a tether.

At operation 1216, shown in FIG. 12, a delivery mechanism is activated to release a payload from the second unmanned aerial vehicle to deliver the payload to the delivery location. For example, and as shown in FIG. 11, the delivery cover 260 may be transitioned to an open configuration in order to release the payload 299 from the payload holding region 232. For example, the first door 260a may be pivoted via the hinge 263a to reveal a portion of the delivery opening 252. Further, the second door 260a may be pivoted via the hinge 263b to reveal another portion of the delivery opening 252. The pivoting of the doors 260a, 260b may cause the payload 299 to be released form the payload holding region 232. The payload 299 may be released at or adjacent the delivery target 214 for access by the customer.

Upon delivery of the payload 299, the dependent vehicle 220 may be returned to the primary UAV 202. For example, the retraction mechanism 218 may activate the spool 219 to reel the coupling mechanism 221 into the bay 210. The reeling of the coupling mechanism 221 may cause the dependent vehicle 220 to return to the bay 210 of the primary UAV 202. In some case, locks or other features may subsequently restrain the dependent vehicle 220 in the bay 210. The primary UAV 202 may return to a shipper location in order to retrieve additional payloads for future deliveries.

FIG. 13 is a flow diagram of steps for delivery of a payload by the system 100 including the primary vehicle 102 and the secondary vehicle 104, such as that shown in FIG. 1, and/or the any of the system described herein, such as the UAV system 200. At block 1302, with reference to FIGS. 1-3, the UAV system navigates from an origin towards an initial delivery location. In various embodiments, flight planning 122 of the primary vehicle 102 may use input from the sensor system 120 of the primary vehicle 102 and/or input from the sensor system 136 of the secondary vehicle 104 to locate the AV 100 and determine the initial delivery location 160. For example, flight planning 122 may use visual input from sensor systems of the UAV system 100 (e.g., perception) to localize into a map to determine the actual location of the UAV system 100 relative to the initial delivery location 160. In some implementations, the flight planner 122 may provide an initial flight plan for the UAV system 100 towards the initial delivery location 160 and flight control 124 may begin executing the initial flight plan as the deployment location is determined. The flight planner 122 may access additional data, such as weather, air traffic, or other data to generate the initial flight plan for the UAV system.

At block 1304, a deployment location is determined based on the initial delivery location 160. Control systems 114 of the primary vehicle 102 may use the initial delivery location 160 to determine the deployment location for the secondary vehicle 104. For example, the deployment location may be chosen such that an angle of the tether 112 connecting the secondary vehicle 104 to the primary vehicle 102 places the secondary vehicle 104 on a ballistic trajectory and creates tension in the tether 112 to aid the secondary vehicle 104 in returning to the primary vehicle. In some implementations, the deployment location may be based on the length of the tether and a distance to the initial delivery location 160. For example, where the tether is 75 m in length, the deployment location may be chosen to be less than 75 m from the initial delivery location 160, taking into account altitude of the primary vehicle 102. The deployment location may be adjusted based on environmental conditions near the delivery location 160 (e.g., buildings, controlled zones for air traffic, bridges, roads, topography, and the like). Deployment location may be further chosen based on weather conditions, air traffic, or other dynamic conditions.

When the deployment location is determined, the flight planner 122 may generate a flight plan to navigate the UAV system 100 to the deployment location before deploying the secondary vehicle 104 from the primary vehicle 102. In some examples, the secondary vehicle 104 may be retained by the primary vehicle 102 such that sensors of the secondary vehicle 104 may gather information as the UAV system 100 travels towards the deployment location. For example, the secondary vehicle 104 may include a downward facing perception system that may be utilized by flight control systems 114 of the primary vehicle 102 to navigate to the deployment location.

The secondary vehicle 104 is deployed from the primary vehicle 102 at the deployment location at block 1306. In some examples, the deployment location may be coincident with a directional change of the primary vehicle 102 such that the secondary vehicle 104 may be released from the primary vehicle 102 as the primary vehicle 102 slows down and executes a change of direction. The primary vehicle 102 may continue along its flight path as the secondary vehicle 104 completes the delivery, such that the primary vehicle 102 is not hovering at the deployment location during delivery. In other implementations, the primary vehicle 102 may hover or execute other types of flight patterns (e.g., holding patterns) as the secondary vehicle 104 completes delivery.

When the UAV system 100 reaches the deployment location, flight control 124 of the primary vehicle 102 may communicate with payload management 130 of the primary vehicle 102 to release the secondary vehicle 104 by, for example opening doors, releasing latches, or otherwise allowing the secondary vehicle 104 to separate from the primary vehicle 102. In some implementations, after release of the secondary vehicle 104, the primary vehicle 102 may lower the secondary vehicle 104 by controlling a winch allowing a tether 112 to extend to its full length. Additionally, a winch may be located at and controlled by the secondary vehicle 104.

In various embodiments, only one of the vehicles may know the precise location of the vehicle (e.g., localization of the vehicle within a skymap). In these implementations, relative position and orientation of the second vehicle may be determined via, for example, an RF or visual system using passive or active targets on one of the vehicles. Such monitoring of relative position and orientation of both vehicles may begin when the secondary vehicle 104 is deployed from the primary vehicle 102. For example, control systems 114 of the primary vehicle 102 may store the exact location of the primary vehicle 102. When the secondary vehicle 104 is released, the sensor system 120 of the primary vehicle may monitor the relative position and orientation of the secondary vehicle 104 using markers or targets on the secondary vehicle 104. For example, the secondary vehicle 104 may include fiducials or other visual targets that may be detected by visual sensors (e.g., cameras) of the primary vehicle. Orientation and size of the fiducials relative to the cameras may be used by control systems 114 of the primary vehicle 102 to determine the location and orientation of the secondary vehicle 104. The location and orientation of the secondary vehicle 104 may be used by the primary vehicle 102 to control some aspect of motion of the secondary vehicle 104 (e.g., controlling altitude of the secondary vehicle 104 by changing length of the tether 112), may be communicated to the secondary vehicle 104 to assist the secondary vehicle 104 in navigation, and/or may be used to monitor for errors in the flight of the secondary vehicle 104. As the secondary vehicle 104 is released from the primary vehicle 102, the secondary vehicle 104 may determine the drop location for the payload.

At block 1308, a drop location 144 is determined based at least on the initial delivery location 160. In some implementations, the drop location 144 and the initial delivery location 160 may be the same location (e.g., a GPS coordinate received from a user device 108). In other implementations, the secondary vehicle 104 and/or the primary vehicle 102 may determine the drop location 144 based on the initial delivery location 160. The determination may further be based on conditions at the delivery location 160, which may be sensed by the primary and/or secondary vehicles 102 and 104 or may be obtained by other sources, such as maps or data provided to the UAV system 100. For example, maps accessible by the UAV system 100 may show buildings within the initial delivery location 160 and perception or vision sensors of the UAV system 100 may detect vehicles within the initial delivery location 160. The drop location 144 may then be chosen to avoid both the buildings and the vehicles within the initial delivery location 160.

In some implementations, the control systems 116 of the secondary vehicle 104 may further execute software programs to determine ideal drop locations 144 within a delivery location 160. For example, a machine learning model may be trained to select ideal delivery sites based on images of delivery locations. Such a model may be designed to select drop locations 144 that are relatively flat, are close to a building (e.g., on a front doorstep) or avoid delivery hazards (e.g., power lines, roads, signs, trees, and other structures). A model may further choose different drop locations 144 based on the type of product being delivered by the secondary vehicle 104. For example, a small but durable payload may be dropped on a front porch, sidewalk, or driveway, while a less robust payload may be delivered on a softer surface such as grass. Such models may also take user input into account. For example, a user may indicate a preference for delivery of payload in the driveway and the model may be trained to locate a driveway from an image of a delivery area 160.

The secondary vehicle 104 and/or the primary vehicle 102 may further determine drop location 144 based on delivery targets located within the initial delivery location 160. For example, in some implementations, a customer may place a visual target on a front sidewalk, doorstep, or other desired delivery location. Visual or perception sensors on either of the vehicles may sense the delivery target and determine that the drop location 144 is to be coincident with the delivery target.

The secondary vehicle navigates to the drop location at block 1310. As the secondary vehicle 104 navigates to the drop location 144, motion of the secondary vehicle 104 may be partially controlled by the primary vehicle 102 based on communications between the primary vehicle 102 and the secondary vehicle 104. For example, the primary vehicle 102 may control the altitude of the secondary vehicle 104 by controlling the tether 112 connecting the secondary vehicle 104 to the primary vehicle 102. The primary vehicle 102 may lower the secondary vehicle 104 from the deployment location to the drop location 144 at a predetermined rate, which may vary based on communications from the secondary vehicle 104. For example, where visual sensors of the secondary vehicle sense an obstacle between the secondary vehicle 104 and the drop location 144 (e.g., a person, car, pet, etc.), the secondary vehicle 104 may transmit a signal to the primary vehicle 102 to slow or stop the lowering of the secondary vehicle 104 until the obstacle is cleared. The primary vehicle 102 may also use sensors (e.g., a visual sensor tracking a fiducial on the secondary vehicle 104) to monitor the secondary vehicle 104 and determine how quickly to lower the secondary vehicle 104 to reach the drop location 144. Such control of the altitude of the secondary vehicle 104 by the primary vehicle 102 may occur simultaneously and work cooperatively with control systems of the secondary vehicle 104 controlling motion of the secondary vehicle 104. For example, the primary vehicle 102 may largely control altitude of the secondary vehicle 104 via the tether, while the secondary vehicle 104 may largely control its own lateral motion through propellers on the secondary vehicle 104. In some implementations, the secondary vehicle 104 may include a winch in addition to or instead of a winch on the primary vehicle 102 to control its own altitude relative to the primary vehicle 102.

In some implementations, as the secondary vehicle 104 navigates to the drop location 144, the primary vehicle 102 may control gross motion of the secondary vehicle 104 and propulsion structures 152 of the secondary vehicle 104 may make fine adjustments to the motion of the secondary vehicle 104. For example, the primary vehicle 102 may control the altitude and general trajectory of the secondary vehicle 104 by controlling the tether 112 connecting the secondary vehicle 104 to the primary vehicle 102. The secondary vehicle 104 may then use its own structures 152 to control for wind, spin of the secondary vehicle 104 and small lateral motions (e.g., delivering a payload under an awning), among other fine motions.

When the secondary vehicle 104 is navigating towards the drop location 144, the secondary vehicle 104 and/or the primary vehicle 102 may monitor the path of the secondary vehicle 104 for obstructions or intruders and may respond to detection of an obstacle or intruder by, for example, adjusting the positioning of the secondary vehicle 104 or by aborting delivery when appropriate. For example, where a car drives to a driveway and parks where the original drop location 144 was, the secondary vehicle 104 may adjust its path to drop the payload next to the car. Where an obstacle is unpredictable or dangerous (e.g., a child, pet, or other quick moving obstacle) and enters the delivery area in the path of the secondary vehicle 104, the delivery may be aborted to prevent injury. For example, the secondary vehicle 104 may signal to the primary vehicle 102 to immediately begin shortening the tether 112 to bring the secondary vehicle 104 back to the primary vehicle 102. In some implementations, the UAV system 100 may communicate with the user (e.g., may send a text or notification to the user device 108) when the secondary vehicle 102 is deployed to lessen the chances of having to abort the delivery due to live or dynamic obstacles.

The payload is released from the secondary vehicle at the drop location at block 1312. Depending on the type of payload, the payload may be released several feet above the drop location 144 and allowed to fall to the drop location 144 (either in free-fall or slowed by a parachute or other wing) or may be placed on a surface at the drop location 144. Because the secondary vehicle 104 can be brought back to the primary vehicle 102 by shortening the tether 112 without a separate "takeoff" of the secondary vehicle 104, payload can be delivered to a surface relatively quickly. For some types of payload, the secondary vehicle 104 may verify identity of the user before dropping the payload at the drop location 144. For example, the secondary vehicle 104 may scan identification or perform facial recognition to ensure customer identity before delivering age restricted items or other sensitive payload, such as prescription medications.

Once the payload is successfully delivered at the drop location 144, the tether may retract to bring the secondary vehicle 104 back towards the primary vehicle 102. The primary vehicle 102 may recapture and retain the secondary vehicle 104 and continue on a flight path returning to the origin 106, proceeding to another distribution location or other location. For example, the primary vehicle 102 may return to a servicing location for the UAV system 100 based on communications received by the UAV system 100.

FIG. 14 illustrates examples of a user interface for selecting a drop location for delivery of a payload by, for example, the UAV system 100 including the primary vehicle 102 and the secondary vehicle 104, and/or the any of the system described herein, such as the UAV system 200. In some examples, an initial delivery location may be selected by a user via a user device 108, for example, by putting an address into a mobile application for ordering products for delivery by the UAV system 100. In some embodiments, the user device 108 may present interfaces allowing the user to provide additional information about the initial delivery location, allowing the UAV system 100 to determine a drop location more convenient for the user. For example, a user interface 1402 may allow the user to visually scan the desired delivery area. A user interface 1404 may allow the user to select a desired delivery location in the delivery area. A user interface 1406 may provide a suggested delivery area to the user. Each of the user interfaces 1402, 1404, and 1406 may be displayed using a display of the user device 108 and may allow the user to scan a desired delivery area, choose a desired delivery area, and may suggest a delivery area, respectively. Input received via the user interfaces 1402, 1404, and 1406 may be communicated to the UAV system 100 to complete delivery of payload to the user.

Figure 15:
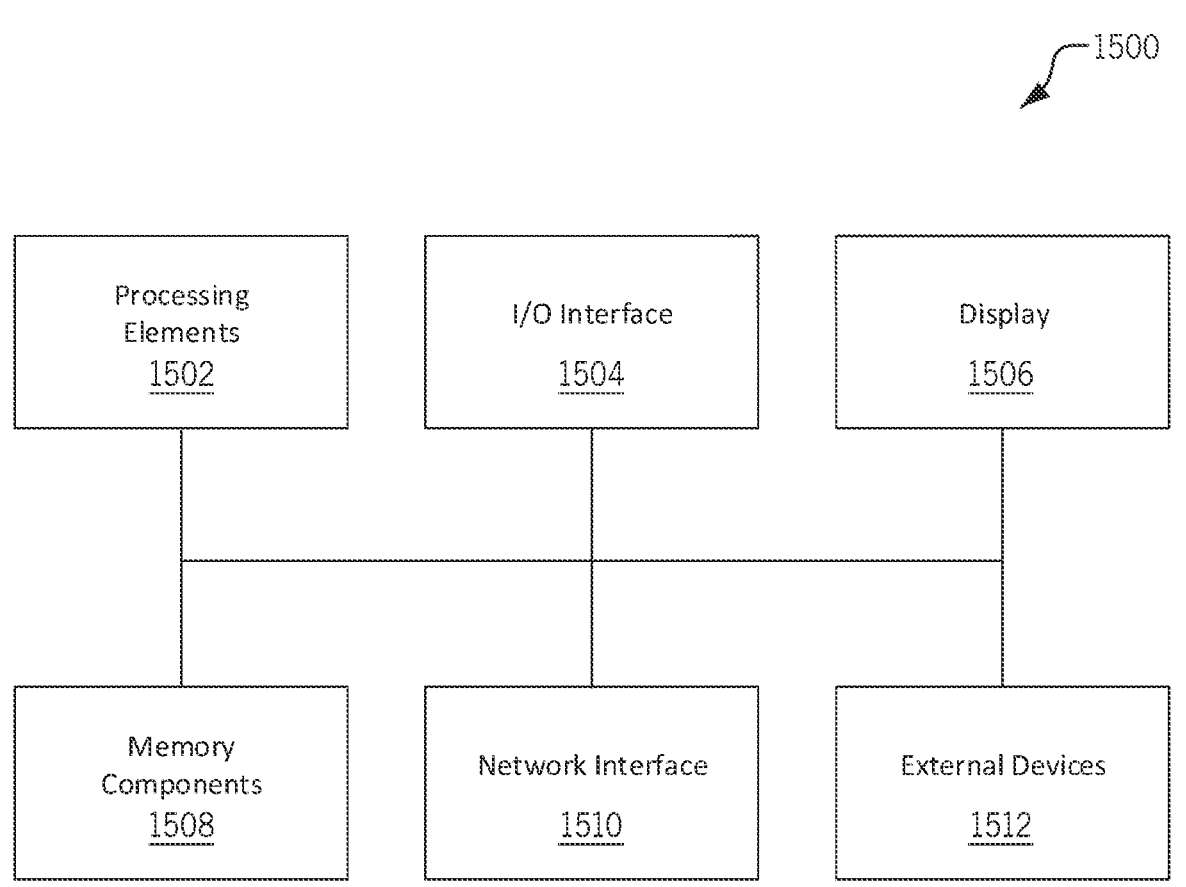
FIG. 15 is a schematic diagram of an example computer system implementing various embodiments in the examples described herein.

FIG. 15 is a schematic diagram of an example computer system 1500 for implementing various embodiments in the examples described herein. A computer system 1500 may be used to implement the customer device 108 (in FIG. 1) or integrated into one or more components of the control systems 114 and the control systems 116. For example, the flight planner 122 and/or the path planner 138 may include one or more of the components of the computer system 1500 shown in FIG. 15. The computer system 1500 is used to implement or execute one or more of the components or operations disclosed in FIGS. 1-14. In FIG. 15, the computer system 1500 may include one or more processing elements 1502, an input/output interface 1504, a display 1506, one or more memory components 1508, a network interface 1510, and one or more external devices 1512. Each of the various components may be in communication with one another through one or more buses, communication networks, such as wired or wireless networks.

The processing element 1502 may be any type of electronic device capable of processing, receiving, and/or transmitting instructions. For example, the processing element 1502 may be a central processing unit, microprocessor, processor, or microcontroller. Additionally, it should be noted that some components of the computer 1500 may be controlled by a first processor and other components may be controlled by a second processor, where the first and second processors may or may not be in communication with each other.

The memory components 1508 are used by the computer 1500 to store instructions for the processing element 1502, as well as store data. The memory components 1508 may be, for example, magneto-optical storage, read-only memory, random access memory, erasable programmable memory, flash memory, or a combination of one or more types of memory components.

The display 1506 provides visual feedback to a user, such as a display of the customer device 108 (FIG. 1). Optionally, the display 1506 may act as an input element to enable a user to control, manipulate, and calibrate various components of the customer device 108, the flight planner 122, the path planner 130, or other components as described in the present disclosure. The display 1506 may be a liquid crystal display, plasma display, organic light-emitting diode display, and/or other suitable display. In embodiments where the display 1506 is used as an input, the display may include one or more touch or input sensors, such as capacitive touch sensors, a resistive grid, or the like.

The I/O interface 1504 allows a user to enter data into the computer 1500, as well as provides an input/output for the computer 1500 to communicate with other devices or services (e.g., AV 100, distribution centers and/or other components in FIG. 1). The I/O interface 1504 can include one or more input buttons, touch pads, and so on.

The network interface 1510 provides communication to and from the computer 1500 to other devices. For example, the network interface 1510 allows the customer device 108 to communicate with the AV 100 through a communication network. The network interface 1510 includes one or more communication protocols, such as, but not limited to WiFi, Ethernet, Bluetooth, and so on. The network interface 1510 may also include one or more hardwired components, such as a Universal Serial Bus (USB) cable, or the like. The configuration of the network interface 1510 depends on the types of communication desired and may be modified to communicate via WiFi, Bluetooth, and so on.

The external devices 1512 are one or more devices that can be used to provide various inputs to the computing device 1500, e.g., mouse, microphone, keyboard, trackpad, or the like. The external devices 1512 may be local or remote and may vary as desired. In some examples, the external devices 1512 may also include one or more additional sensors.

The foregoing description has a broad application. For example, while examples disclosed herein may focus on central communication system, it should be appreciated that the concepts disclosed herein may equally apply to other systems, such as a distributed, central or decentralized system, or a cloud system. Accordingly, the disclosure is meant only to provide examples of various systems and methods and is not intended to suggest that the scope of the disclosure, including the claims, is limited to these examples.

The technology described herein may be implemented as logical operations and/or modules in one or more systems. The logical operations may be implemented as a sequence of processor implemented steps directed by software programs executing in one or more computer systems and as interconnected machine or circuit modules within one or more computer systems, or as a combination of both. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology may be employed in special purpose devices independent of a personal computer.

Other examples and implementations are within the scope and spirit of the disclosure and appended claims. For example, features implementing functions may also be physically located at various positions, including being distributed such that portions of functions are implemented at different physical locations. Thus, the foregoing descriptions of the specific examples described herein are presented for purposes of illustration and description. They are not targeted to be exhaustive or to limit the examples to the precise forms disclosed. It will be apparent to one of ordinary skill in the art that many modifications and variations are possible in view of the above teachings.

What is claimed is:

1. A method for delivering a payload, the method comprising:

positioning a first unmanned aerial vehicle within a threshold distance of a delivery location, wherein the first unmanned aerial vehicle comprises a bay configured to contain a second unmanned aerial vehicle, the second unmanned aerial vehicle exposed to the external environment when positioned within the bay of the first unmanned aerial vehicle;

releasing the second unmanned aerial vehicle from the first unmanned aerial vehicle based on the first unmanned aerial vehicle positioned within the threshold distance, wherein the second unmanned aerial vehicle comprises a payload holding region configured to contain the payload, the payload holding region enclosed at least partially by a delivery mechanism configured to control access to the payload holding region for release of the payload;

causing the second unmanned aerial vehicle to reach the delivery location; and activating the delivery mechanism to release the payload from the payload holding region of the second unmanned aerial vehicle to deliver the payload to the delivery location.

2. The method of claim 1, wherein causing the second unmanned vehicle to reach the delivery location further comprises actively steering the second unmanned vehicle.

3. The method of claim 2, wherein actively steering the second unmanned vehicle comprises at least one of:

changing at least one of a position, a speed, or a heading of the second unmanned vehicle by varying at least one of a position, a speed, or a heading of the first unmanned vehicle; or activating a steering mechanism on the second unmanned vehicle to directly change the position, the speed, or the heading of the second unmanned vehicle.

4. The method of claim 3, wherein the steering mechanism includes at least one thruster coupled to the second unmanned vehicle.

5. The method of claim 1, wherein causing the second unmanned vehicle to reach the delivery location further comprises selectively timing the releasing of the second unmanned vehicle from the first unmanned aerial vehicle once based on at least one of: a wind characteristic of the delivery location or a position of the first unmanned aerial vehicle relative to the delivery location.

6. The method of claim 1, wherein the second unmanned vehicle is coupled to the first unmanned aerial vehicle.

7. The method of claim 6, wherein the second unmanned vehicle is releasably coupled to the first unmanned vehicle via a mechanical connection.

8. The method of claim 1, further comprising retracting the second unmanned vehicle to the first unmanned aerial vehicle after the payload has been delivered.

9. The method of claim 8, wherein positioning the second unmanned vehicle within the first unmanned aerial vehicle comprises operating a retraction mechanism to physically induce the second unmanned vehicle into a compartment within the first unmanned aerial vehicle.

10. The method of claim 1, wherein the second unmanned vehicle is steerable by and relative to the first unmanned aerial vehicle.

11. The method of claim 1, further comprising releasing the second unmanned vehicle along a ground surface at or adjacent to the delivery location, and causing the second unmanned vehicle to travel a distance on the ground surface.

12. The method of claim 1, wherein activating the delivery mechanism comprises selectively opening a pair of doors of the delivery mechanism to release the payload from the payload holding region.

13. The system of claim 1, wherein the dependent unmanned aerial vehicle is exposed to the external environment through an opening defined in a bottom of the first unmanned aerial vehicle.

14. A system comprising:

a primary unmanned aerial vehicle comprising a bay configured to receive and secure a dependent unmanned aerial vehicle therein; and the dependent unmanned aerial vehicle configured to deliver a payload from the primary unmanned aerial vehicle, the dependent unmanned aerial vehicle comprising:

a body defining a payload holding region configured to contain the payload;

a delivery mechanism at least partially enclosing the payload holding region and configured to control access to the payload holding region for release of the payload;

a coupling mechanism configured to couple the body to the primary unmanned aerial vehicle; and a control feature configured to change a flight characteristic of the body;

wherein the dependent unmanned aerial vehicle is exposed to the external environment when positioned within the bay of the primary unmanned aerial vehicle.

15. The system of claim 14, wherein the body comprises a delivery cover that covers the payload holding region, wherein in a closed position of the delivery cover the payload holding region is inaccessible from an exterior surface of the body, and in an open position of the delivery cover, the payload holding region is accessible from the exterior surface of the body.

16. The system of claim 15, wherein the body comprises a loading cover that covers the payload holding region, wherein in a closed position of the loading cover, the payload holding region is inaccessible from the exterior surface of the body, and in an open position of the loading cover, the payload holding region is accessible from the exterior surface of the body.

17. The system of claim 16, wherein the loading cover extends over a loading opening in the exterior surface of the body and the delivery cover extends over a delivery opening in the exterior surface of the body opposite the loading opening, wherein the delivery opening is larger than the loading opening.

18. The system of claim 14, further comprising a bumper extending around at least a portion of the body, wherein the bumper reduces impact forces experienced by the at least the portion of the body.

19. The system of claim 14, further comprising a controller in electrical communication with the steering mechanism and the primary unmanned aerial vehicle, wherein the controller activates and controls the steering mechanism.

20. The system of claim 14, wherein the coupling mechanism is configured to manipulate the body in response to forces exerted on the coupling mechanism by the primary unmanned aerial vehicle.

21. The system of claim 20, wherein the coupling mechanism acts to direct the body based on movement of the primary unmanned aerial vehicle.

22. The system of claim 14, wherein:

the dependent unmanned aerial vehicle comprises a loading cover configured to control access to the payload holding region for loading of the payload therein; and the coupling mechanism is connected to the loading cover.

23. The system of claim 14, wherein the dependent unmanned aerial vehicle includes one or more sensors exposed to the external environment and usable when the dependent unmanned aerial vehicle is positioned within the bay of the primary unmanned aerial vehicle.

24. The system of claim 14, wherein the dependent unmanned aerial vehicle defines a bottom surface of the system when positioned within the bay of the primary unmanned aerial vehicle.

25. The system of claim 14, wherein the coupling mechanism comprises a tether extending through the bay and operable to retract the dependent unmanned aerial vehicle into the bay of the primary unmanned aerial vehicle.

26. A system comprising:

a primary unmanned aerial vehicle comprising a bay configured to receive and secure a dependent unmanned aerial vehicle; and the dependent unmanned aerial vehicle coupled to the primary unmanned aerial vehicle, the dependent unmanned aerial vehicle comprising a payload holding region configured to contain a payload, the payload holding region enclosed at least partially by a delivery mechanism configured to control access to the payload holding region for release of the payload;

wherein the dependent unmanned aerial vehicle is exposed to the external environment when positioned within the bay of the primary unmanned aerial vehicle; and wherein the primary unmanned aerial vehicle is configured to adjust macro positions of the dependent unmanned aerial vehicle and the dependent unmanned aerial vehicle is configured to adjust micro positions of the dependent unmanned aerial vehicle separate from the macro positions.

27. The system of claim 26, wherein the primary unmanned aerial vehicle manipulates the macro positions of the dependent unmanned aerial vehicle by generating a change in a flight characteristic that translates to a force applied to a mechanical coupling on the dependent unmanned aerial vehicle.

28. The system of claim 26, wherein the dependent unmanned aerial vehicle comprises a steering mechanism to change a velocity or a heading of the dependent unmanned aerial vehicle.

29. The system of claim 26, further comprising a tether that mechanically couples the primary unmanned aerial vehicle to the dependent unmanned aerial vehicle.

30. The system of claim 29, wherein the dependent unmanned aerial vehicle is electronically and/or communicatively coupled with the primary unmanned aerial vehicle via the tether.

31. The system of claim 29, wherein the tether comprises a bridle that defines a multi-point attachment with the dependent UAV.

\* \* \* \* \*